(12) United States Patent
Higashino et al.

(10) Patent No.: US 6,366,000 B1
(45) Date of Patent: Apr. 2, 2002

(54) ALTERNATOR

(75) Inventors: Kyoko Higashino; Katsumi Adachi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/680,262

(22) Filed: Oct. 5, 2000

(30) Foreign Application Priority Data

Jan. 25, 2000 (JP) ........................................ 2000-015915

(51) Int. Cl.[7] .............................. H02K 3/46; H02K 1/04; H02K 15/12
(52) U.S. Cl. ........................... 310/260; 310/43; 310/45; 310/51; 310/64; 310/208
(58) Field of Search .............................. 310/43, 45, 51, 310/58, 64, 85, 87, 207, 208, 260, 270

(56) References Cited

U.S. PATENT DOCUMENTS

| | | | | |
|---|---|---|---|---|
| 714,721 | A | * 12/1902 | Lundell | 310/208 |
| 3,194,933 | A | * 7/1965 | Hackney et al. | 310/43 |
| 3,453,468 | A | * 7/1969 | Lund | 310/208 |
| 3,792,299 | A | * 2/1974 | Hallerback | 310/258 |
| 3,919,572 | A | * 11/1975 | Desy | 310/45 |
| 3,979,822 | A | * 9/1976 | Halm | 29/596 |
| 4,217,514 | A | * 8/1980 | Simazaki et al. | 310/260 |
| 4,219,748 | A | * 8/1980 | Sakaguchi et al. | 310/71 |
| 6,069,431 | A | * 5/2000 | Satoh et al. | 310/260 |
| 6,147,432 | A | * 11/2000 | Kusase et al. | 310/260 |
| 6,202,285 | B1 | * 3/2001 | Bell | 29/596 |
| 6,208,057 | B1 | * 3/2001 | Schultz et al. | 310/182 |
| 6,268,678 | B1 | * 7/2001 | Asao et al. | 310/201 |
| D448,729 | S | * 10/2001 | Asao et al. | D13/122 |

FOREIGN PATENT DOCUMENTS

| | | | |
|---|---|---|---|
| DE | A-199-22-794 | 11/1999 | |
| JP | 54-183601 | 12/1979 | .......... H02K/15/12 |
| JP | 58-136966 | 9/1983 | ............ H02K/9/22 |
| JP | 62-272836 | 11/1987 | ............ H02K/3/04 |
| JP | 3-7654 | 1/1991 | ............ H02K/9/22 |
| JP | H-4-26345 | 1/1992 | |
| JP | 11-98788 | 4/1999 | .......... H02K/19/22 |
| JP | A-11-155270 | 6/1999 | |

* cited by examiner

*Primary Examiner*—Nestor Ramirez
*Assistant Examiner*—Dang Dinh Le
(74) *Attorney, Agent, or Firm*—Sughrue Mion, PLLC

(57) ABSTRACT

An alternator includes a rotor for forming north-seeking (N) and south-seeking (S) poles about a rotational circumference, a stator including a stator core disposed facing the rotor, and a stator winding installed in the stator core, a bracket supporting the rotor and the stator, and a cooling means for cooling the stator winding by moving together with the rotor and generating a flow of cooling air inside the bracket, wherein the stator core includes a laminated core formed with a number of slots extending axially at a predetermined pitch in a circumferential direction, the stator winding includes a number of winding sub-portions in each of which a long strand of wire is wound so as to alternately occupy an inner layer and an outer layer in a slot depth direction within the slots at intervals of a predetermined number of slots, the strand of wire folding back outside the slots at first and second axial end surfaces of the stator core to form turn portions, the turn portions align in a circumferential direction to constitute coil ends, an electrically-insulative resin portion is disposed so as to completely cover the coil ends, and at least one surface of the electrically-insulative resin portion selected from a rotor-facing surface and a bracket-facing surface is formed into a smooth surface.

20 Claims, 23 Drawing Sheets

ALTERNATOR

BACKGROUND OF THE INVENTION

1. Field of the Invention

The present invention relates to an alternator driven by an internal combustion engine, for example, and in particular, relates to a stator construction for an automotive alternator mounted to an automotive vehicle such as a passenger car or a truck.

2. Description of the Related Art

FIG. 22 is a cross section showing a conventional automotive alternator, and FIG. 23 is a perspective showing a stator of the conventional automotive alternator.

In FIGS. 22 and 23, the automotive alternator is constructed by rotatably mounting a Lundell-type rotor 7 by means of a shaft 6 inside a case 3 constructed from an aluminum front bracket 1 and an aluminum rear bracket 2, and fastening a stator 50 to an inner wall of the case 3 so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case 3 such that the pair of brushes 10 slide in contact with the slip rings 9. A regulator 18 for adjusting the magnitude of alternating voltage generated in the stator 50 is fastened by adhesive to a heat sink 17 fitted onto the brush holder 11. A rectifier 12 which is electrically connected to the stator 50 and converts alternating current generated in the stator 50 into direct current is mounted inside the case 3.

The rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has six claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

The stator 50 includes: a cylindrical stator core 51 formed with a number of slots 51a extending axially at a predetermined pitch in a circumferential direction; a stator winding 52 wound onto the stator core 51; electrically-insulative resin portions 25 composed of epoxy resin or the like molded around front-end and rear-end coil ends 52a and 52b of the stator winding 52; and insulators (not shown) installed in each of the slots 51a for electrically insulating the stator winding 52 from the stator core 51. In this case 3, the stator core 51 is formed with thirty-six slots 51a at even pitch so as to house one three-phase alternating current winding such that the number of slots housing each winding phase group corresponds to the number of magnetic poles (twelve) in the rotor 7.

Air intake openings 1a and 2a are disposed in axial end surfaces of the front bracket 1 and the rear bracket 2, and air discharge openings 1b and 2b are disposed in two outer circumferential shoulder portions of the front bracket 1 and the rear bracket 2, facing the radial outside of the front-end and rear-end coil ends 52a and 52b of the stator winding 52.

Next, the method of constructing the conventional stator 50 will be described with reference to FIGS. 24 to 27.

First, belt-shaped bodies having protrusions and recesses are prepared from belt-shaped thin sheets composed of SPCC material being a magnetic material. Then, a parallelepiped laminated core 55, shown in FIG. 24, is prepared by laminating a predetermined number of sheets of the belt-shaped bodies and laser welding an outer portion thereof. Thirtysix slots 55a are formed on one side of this laminated core 55.

A stator winding group 57A having an overall flat shape is prepared by winding one strand of wire 56 a predetermined number of turns in a wave winding at a pitch of three slots, the strand of wire being composed of an insulated copper wire material having a circular cross section. The winding start and finish ends of the strand of wire 56 constituting this stator winding group 57A become an output wire 56a and a neutral-point 56b, respectively. In addition, stator winding groups 57B and 57C are similarly prepared by winding a single strand of wire 56 in each case.

Thereafter, the three stator winding groups 57A, 57B, and 57C are superposed so as to be offset by a pitch of one slot and installed in the laminated core 55 by inserting each respective winding group into every third slot 55a as shown in FIG. 25. Thus, the three stator winding groups 57A, 57B, and 57C are installed in the laminated core 55 as shown in FIG. 26.

Next, the laminated core 55 is bent into a cylindrical shape by means of a shaping device (not shown). Then, the ends of the laminated core 55 are abutted and laser welded to each other to obtain a cylindrical stator core 51. Thus, a stator is obtained with the three stator winding groups 57A, 57B, and 57C wound into the stator core 51 as shown in FIG. 27.

In addition, the coil ends of the stator winding groups 57A, 57B, and 57C are molded into the electrically-insulative resin portions 25 to obtain the stator 50 shown in FIG. 23.

In the stator 50 constructed in this manner, the neutral-points 56b of each strand of wire 56 constituting the stator winding groups 57A, 57B, and 57C are connected to obtain the stator winding 52 which is a three-phase alternating-current winding. These stator winding groups 57A, 57B, and 57C have a mutual phase difference of 120° and correspond to an a-phase, b-phase, and c-phase winding group, respectively, of the three-phase alternating-current winding. The output wires 56a of each strand of wire 56 constituting the stator winding groups 57A, 57B, and 57C are connected to the rectifier 12.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator winding 52, generating electromotive force in the stator winding 52. This alternating electromotive force passes through the rectifier 12 and is converted into direct current, the magnitude of the voltage is adjusted by the regulator 18, and the battery is recharged.

At the rear end, external air is drawn in through the air intake openings 2a disposed opposite the heat sink of the rectifier 12 and the heat sink 17 of the regulator 18, respectively, by rotation of the fans 5, flowing along the axis of the shaft 6, cooling the rectifier 12 and the regulator 18, and is then deflected centrifugally by the fans 5, cooling the rear-end coil end 52*b* of the stator winding 52 before being expelled to the outside through the air discharge openings 2*b*. At the same time, at the front end, external air is drawn in axially through the air intake openings 1*a* by rotation of the fans 5, and is then deflected centrifugally by the fans 5, cooling the front-end coil end 52*a* of the stator winding 52 before being expelled to the outside through the air discharge openings 1*b*.

In the conventional stator 50, each of the stator winding groups 57A, 57B, and 57C constituting the stator winding 52 is prepared by wave winding one strand of wire 56 for a predetermined number of turns at a pitch of three slots, the winding groups being wound into every third slot 51*a* with each winding group offset from the next by one slot so as to constitute an outer layer, an intermediate layer, and an inner layer in the radial direction.

Thus, because the turn portions of the strands of wire 56 constituting the coil ends are not aligned so as to be stacked in the circumferential direction, it is difficult to mold the coil ends uniformly in the electrically-insulative resin portions 25 around the entire circumference, making the electrically-insulative resin portions 25 assume shapes that are biased in both a circumferential and an axial direction. Thus, the heat dissipation of the coil ends including the electrically-insulative resin portions 25 is not uniform, causing the cooling of the stator winding 52 to deteriorate, and one problem has been that temperature increases in the stator winding 52 cannot be suppressed.

Because the turn portions of the strands of wire 56 constituting the coil ends are not aligned so as to be stacked in the circumferential direction, it is not possible to install the strands of wire 56 at a high density and another problem has been that high output cannot be achieved.

The turn portions of circumferentially adjacent strands of wire 56 of the stator winding groups 57A and 57C constituting the inner and outer layers are mutually offset in a radial direction, and inner circumferential surfaces and outer circumferential surfaces of the electrically-insulative resin portions 25 have irregular shapes in the circumferential direction as shown in FIG. 23. Thus, yet another problem has been that a resulting increase in wind resistance and interference occurring between the stator 7 and the inner circumferential surfaces of the electrically-insulative resin portions 25 has caused an increase in wind noise.

SUMMARY OF THE INVENTION

The present invention aims to solve the above problems and an object of the present invention is to provide an alternator which can be used in an automotive vehicle, which can achieve high output and noise reduction, and in which temperature increases in a stator winding are suppressed by constructing the stator winding from a number of winding sub-portions in each of which a long strand of wire is wound so as to alternately occupy an inner layer and an outer layer in a slot depth direction within slots at intervals of a predetermined number of slots, the strands of wire folding back outside the slots at axial end surfaces of the stator core, and by forming into a smooth surface at least one surface selected from a rotor-facing surface and a bracket-facing surface of an electrically-insulative resin portion disposed so as to cover a coil end.

In order to achieve the above object, according to one aspect of the present invention, there is provided an alternator including:

a rotor for forming north-seeking (N) and south-seeking (S) poles about a rotational circumference;

a stator including:
  a stator core disposed facing the rotor; and
  a stator winding installed in the stator core;

a bracket supporting the rotor and the stator; and a cooling means for cooling the stator winding by moving together with the rotor and generating a flow of cooling air inside the bracket, wherein the stator core includes a laminated core formed with a number of slots extending axially at a predetermined pitch in a circumferential direction, the stator winding includes a number of winding sub-portions in each of which a long strand of wire is wound so as to alternately occupy an inner layer and an outer layer in a slot depth direction within the slots at intervals of a predetermined number of slots, the strand of wire folding back outside the slots at first and second axial end surfaces of the stator core to form turn portions, the turn portions align in a circumferential direction to constitute coil ends, an electrically-insulative resin portion is disposed so as to completely cover the coil ends, and at least one surface of the electrically-insulative resin portion selected from a rotor-facing surface and a bracket-facing surface is formed into a smooth surface.

According to another aspect of the present invention, there is provided an alternator including:

a rotor for forming north-seeking (N) and south-seeking (S) poles about a rotational circumference;

a stator including:
  a stator core disposed facing the rotor; and
  a stator winding installed in the stator core;

a bracket supporting the rotor and the stator; and a cooling means for cooling the stator winding by moving together with the rotor and generating a flow of cooling air inside the bracket, wherein the stator core includes a laminated core formed with a number of slots extending axially at a predetermined pitch in a circumferential direction, the stator winding includes a number of winding sub-portions in each of which a long strand of wire is wound so as to alternately occupy an inner layer and an outer layer in a slot depth direction within the slots at intervals of a predetermined number of slots, the strand of wire folding back outside the slots at first and second axial end surfaces of the stator core to form turn portions, the turn portions align in a circumferential direction to constitute coil ends, an electrically-insulative resin portion is disposed so as to cover an inner circumferential portion of the coil ends and leave an apex portion and a radially outer circumferential portion of the coil end exposed, and a rotor-facing surface of the electrically-insulative resin portion is formed into a smooth surface.

According to still another aspect of the present invention, there is provided an alternator including:

a rotor for forming north-seeking (N) and south-seeking (S) poles about a rotational circumference;

a stator including:

a stator core disposed facing the rotor; and
a stator winding installed in the stator core;
a bracket supporting the rotor and the stator; and
a cooling means for cooling the stator winding by moving together with the rotor and generating a flow of cooling air inside the bracket, wherein the stator core includes a laminated core formed with a number of slots extending axially at a predetermined pitch in a circumferential direction, the stator winding includes a number of winding sub-portions in each of which a long strand of wire is wound so as to alternately occupy an inner layer and an outer layer in a slot depth direction within the slots at intervals of a predetermined number of slots, the strand of wire folding back outside the slots at first and second axial end surfaces of the stator core to form turn portions, the turn portions align in a circumferential direction to constitute coil ends, an electrically-insulative resin portion is disposed so as to cover an outer circumferential portion of the coil ends and leave an apex portion and a radially inner circumferential portion of the coil end exposed, and a bracket-facing surface of the electrically-insulative resin portion is formed into a smooth surface.

DETAILED DESCRIPTION OF THE PREFERRED EMBODIMENTS

The preferred embodiments of the present invention will now be explained with reference to the drawings.

EMBODIMENT 1

Figure 1:
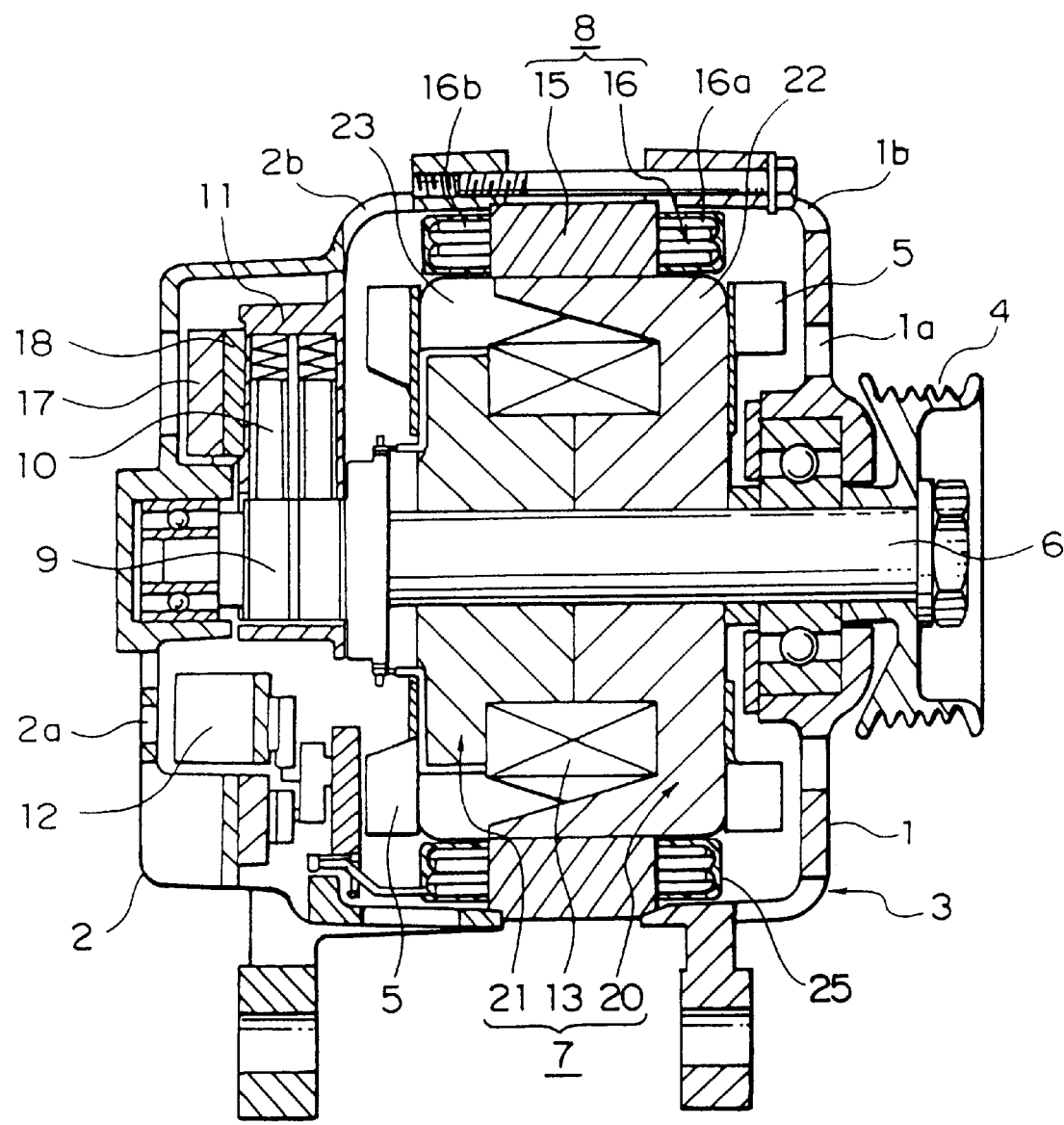
FIG. 1 is a cross section showing a construction of an automotive alternator according to Embodiment 1 of the present invention.
Figure 2:
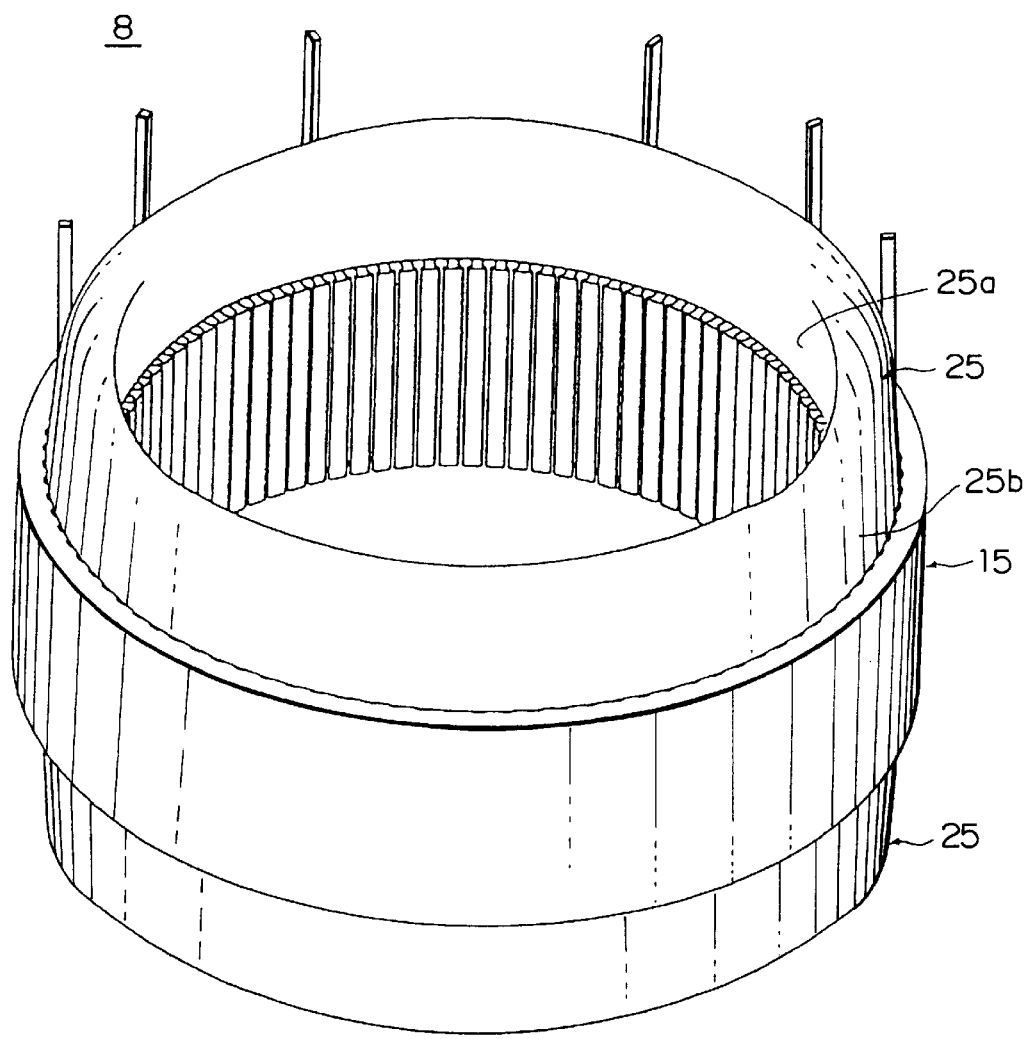
FIG. 2 is a perspective showing a stator of the automotive alternator according to Embodiment 1 of the present invention.
Figure 3:
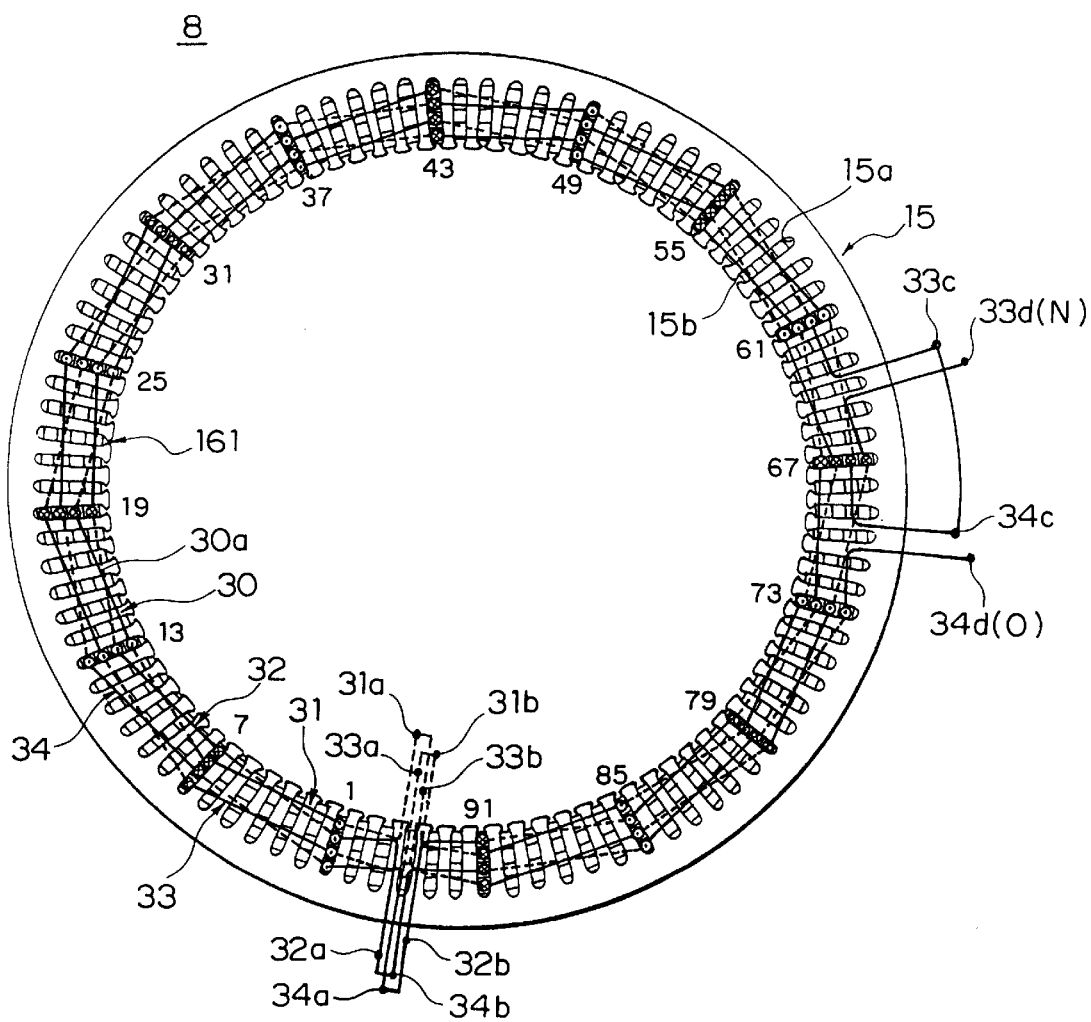
FIG. 3 is an end elevation explaining connections in one stator winding phase group in the automotive alternator according to Embodiment 1 of the present invention.
Figure 4:
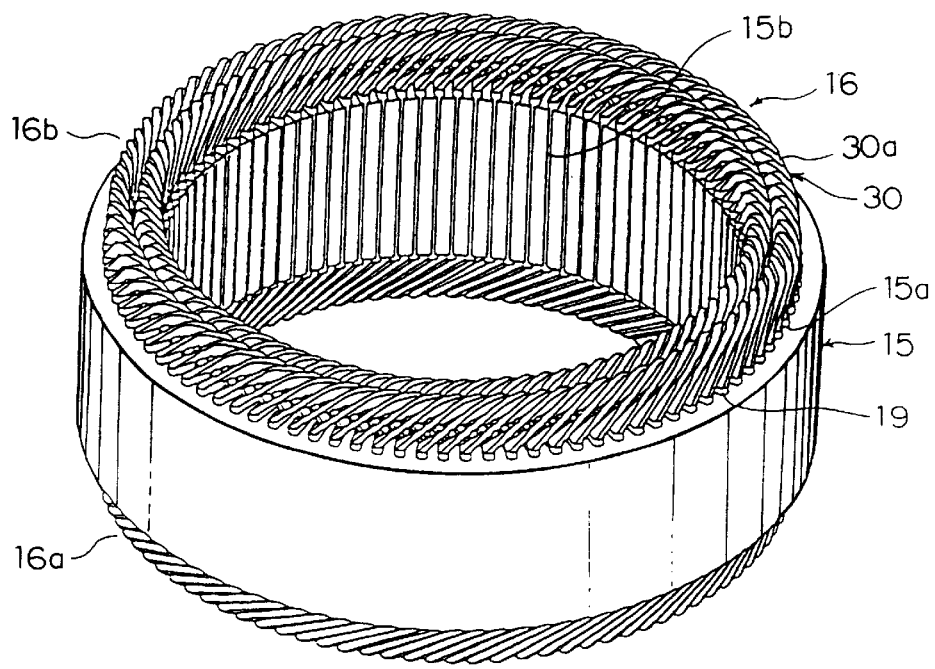
FIG. 4 is a perspective explaining a stator winding mounted into the stator of the automotive alternator according to Embodiment 1 of the present invention.
Figure 5:
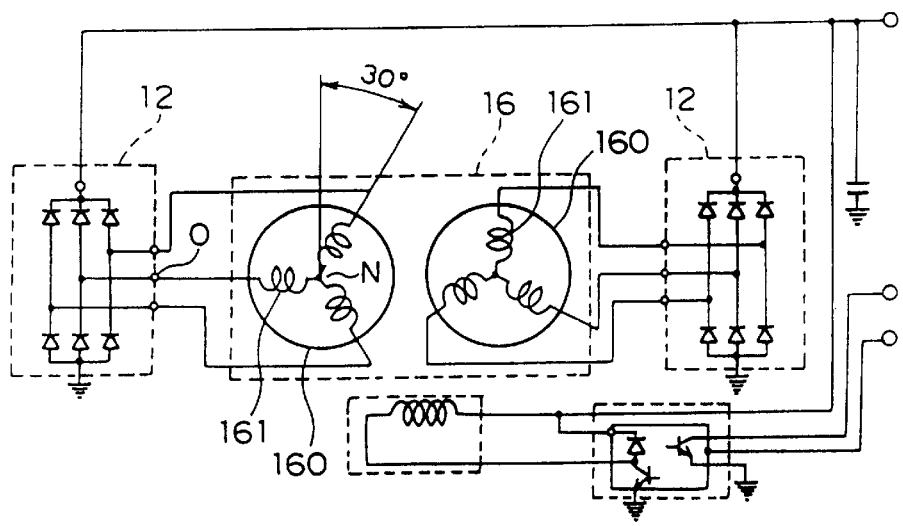
FIG. 5 is a circuit diagram for the automotive alternator according to Embodiment 1 of the present invention.
Figure 6:
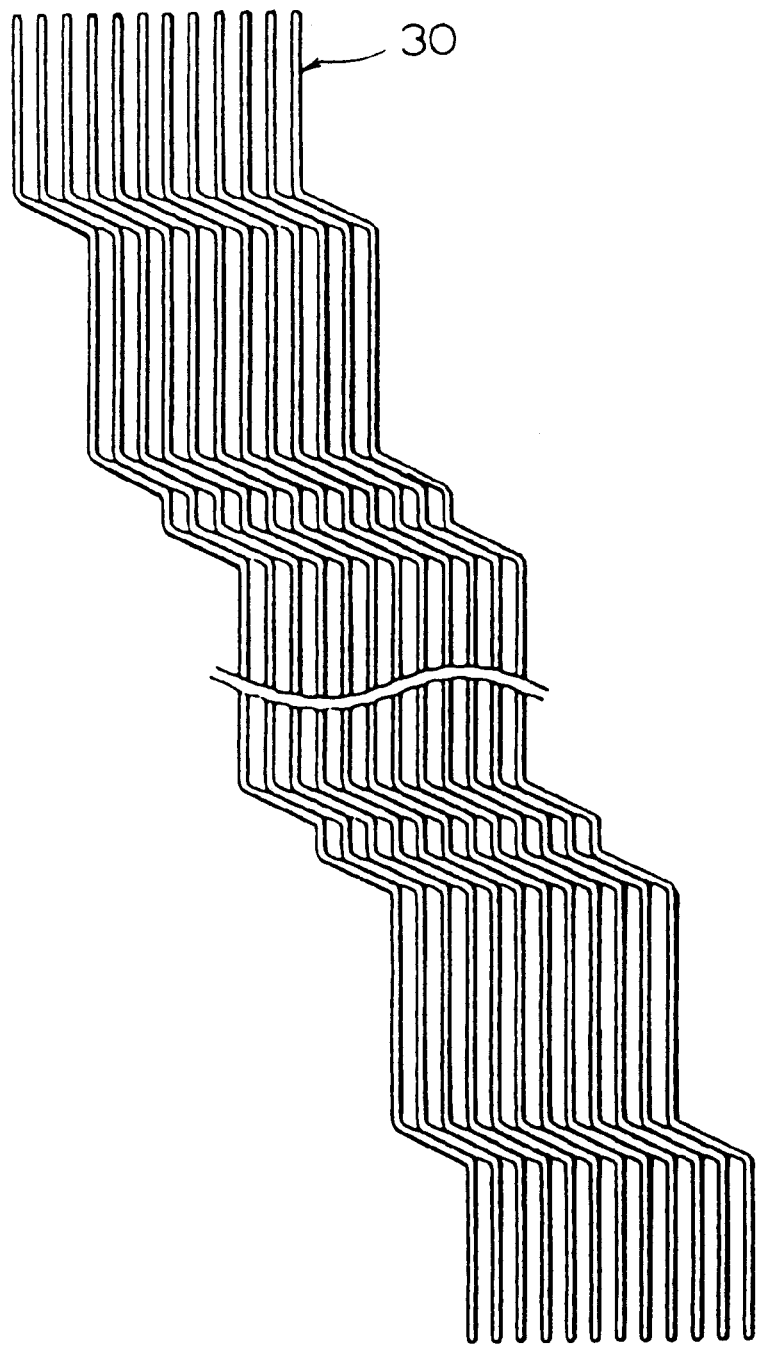
FIG. 6 is a diagram explaining the manufacturing process for wire-strand groups constituting part of the stator winding used in the automotive alternator according to Embodiment 1 of the present invention.
Figure 7:
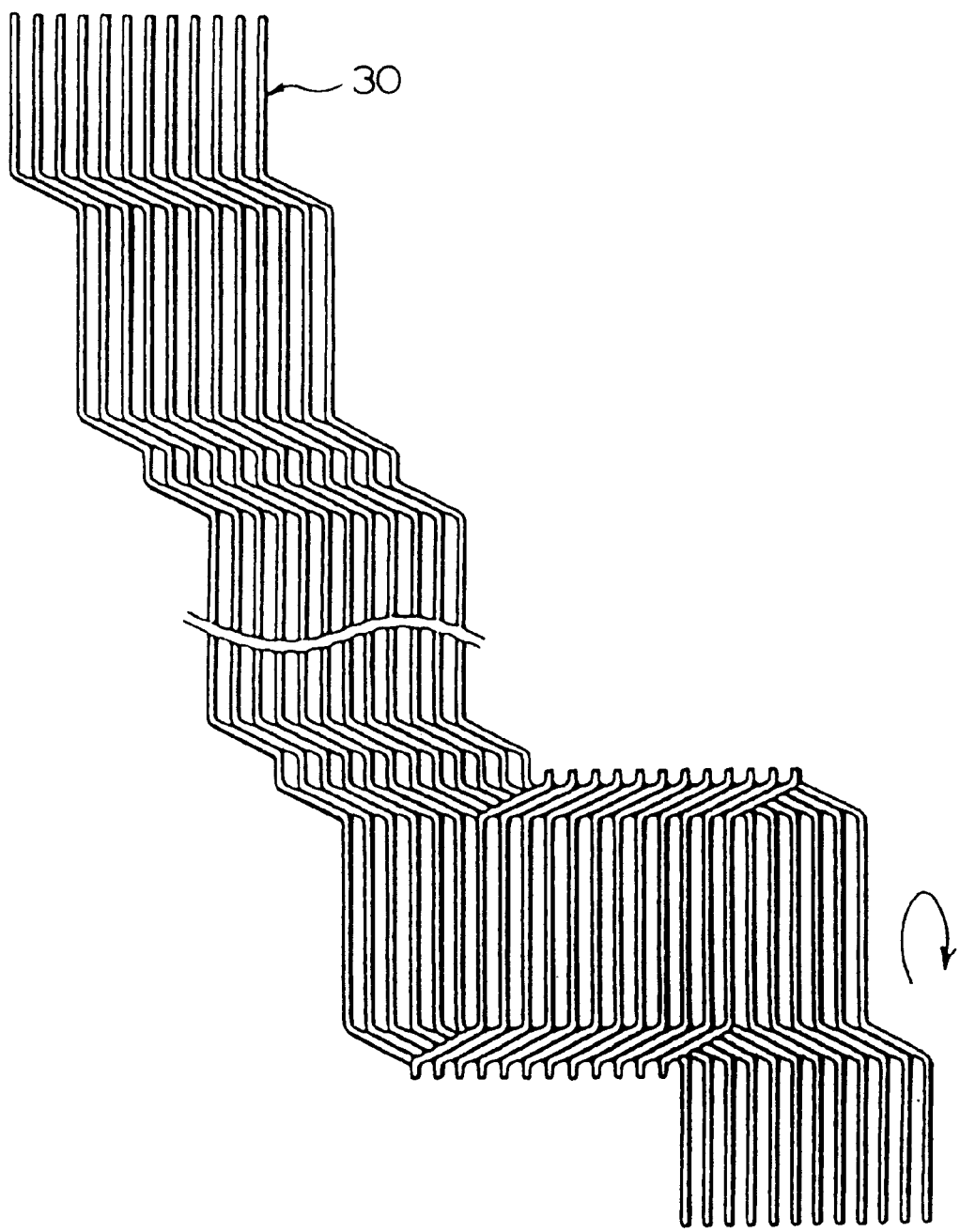
FIG. 7 is a diagram explaining the manufacturing process for wire-strand groups constituting part of the stator winding used in the automotive alternator according to Embodiment 1 of the present invention.
Figure 8:
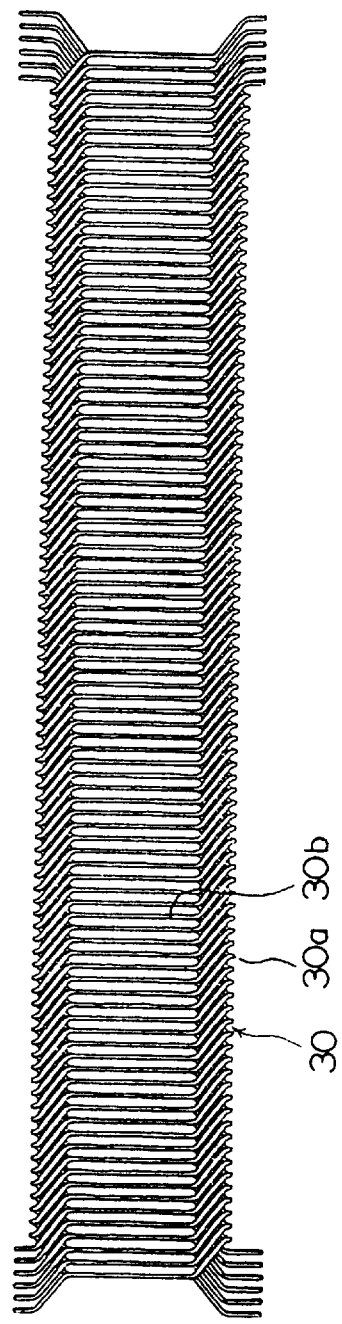
FIGS. 8A and 8B are an end elevation and a plan, respectively, showing an inner-layer wire-strand group constituting part of the stator winding used in the automotive alternator according to Embodiment 1 of the present invention.
Figure 9:
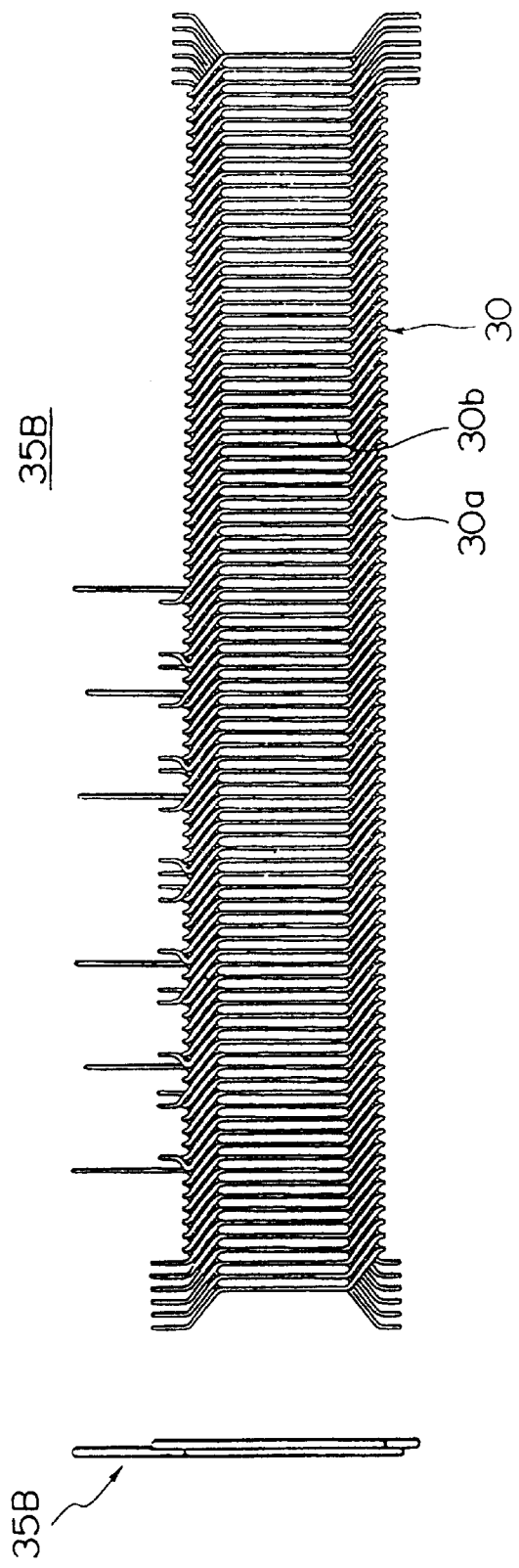
FIGS. 9A and 9B are an end elevation and a plan, respectively, showing an outer-layer wire-strand group constituting part of the stator winding used in the automotive alternator according to Embodiment 1 of the present invention.
Figure 10:
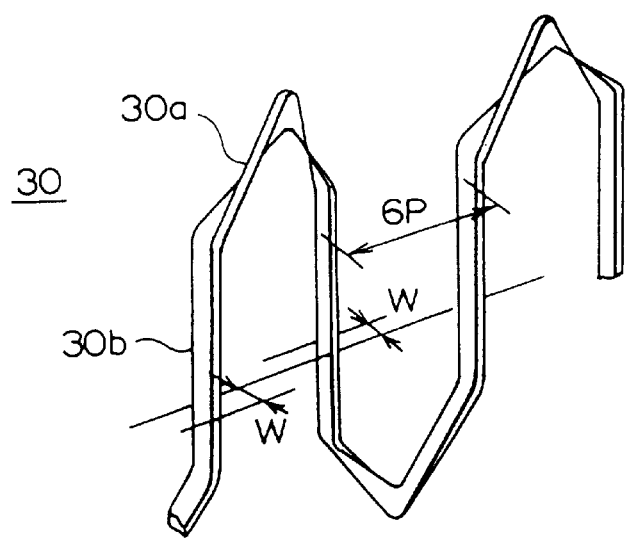
FIG. 10 is a perspective showing part of a strand of wire constituting part of the stator winding used in the automotive alternator according to Embodiment 1 of the present invention.
Figure 11:
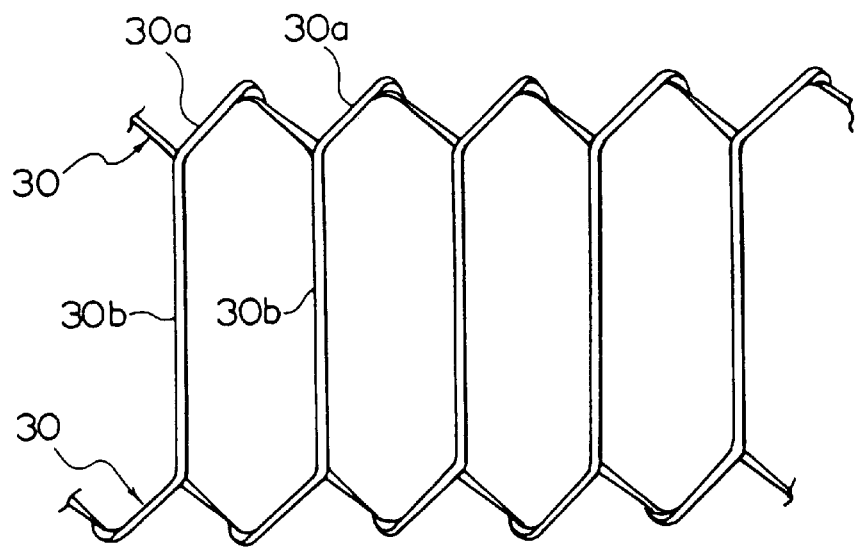
FIG. 11 is a diagram explaining the arrangement of strands of wire constituting part of the stator winding used in the automotive alternator according to Embodiment 1 of the present invention.
Figure 12:
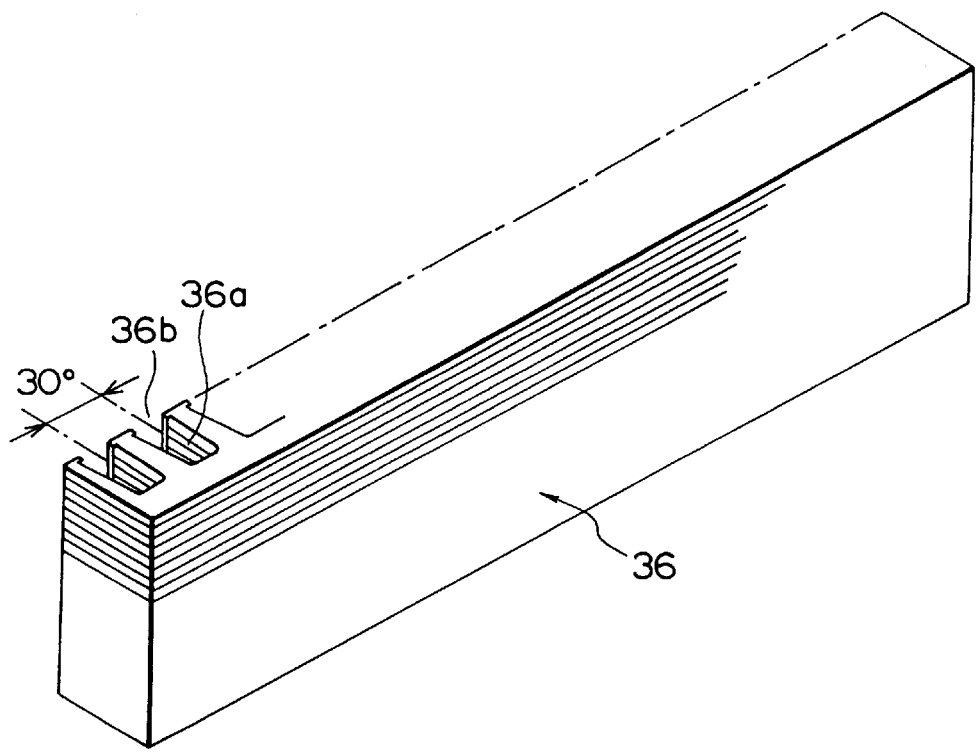
FIG. 12 is a perspective showing a laminated core constituting a stator core used in this automotive alternator.
Figure 13A:
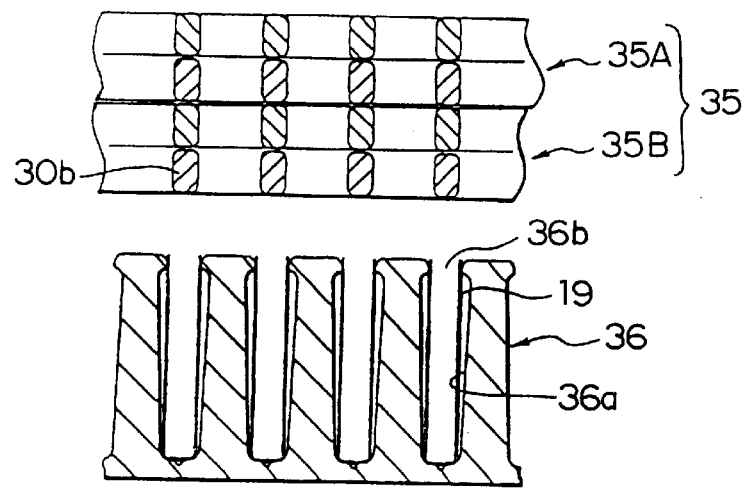
FIGS. 13A, 13B, and 13C are cross sections explaining the manufacturing process for the stator used in this automotive alternator.
Figure 13B:
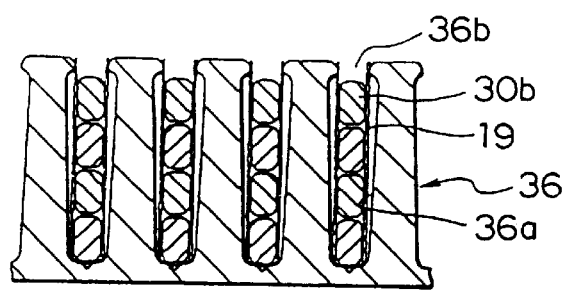
Figure 13C:
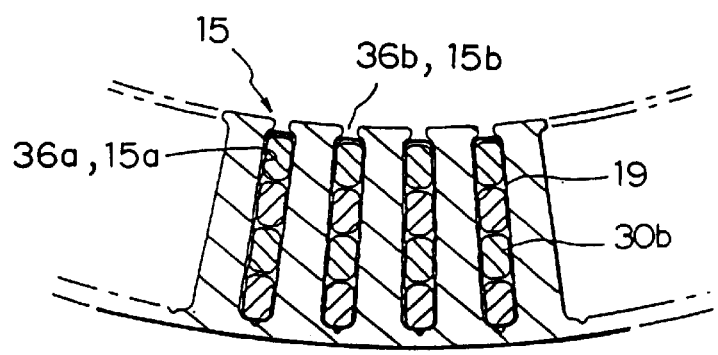
Figure 14:
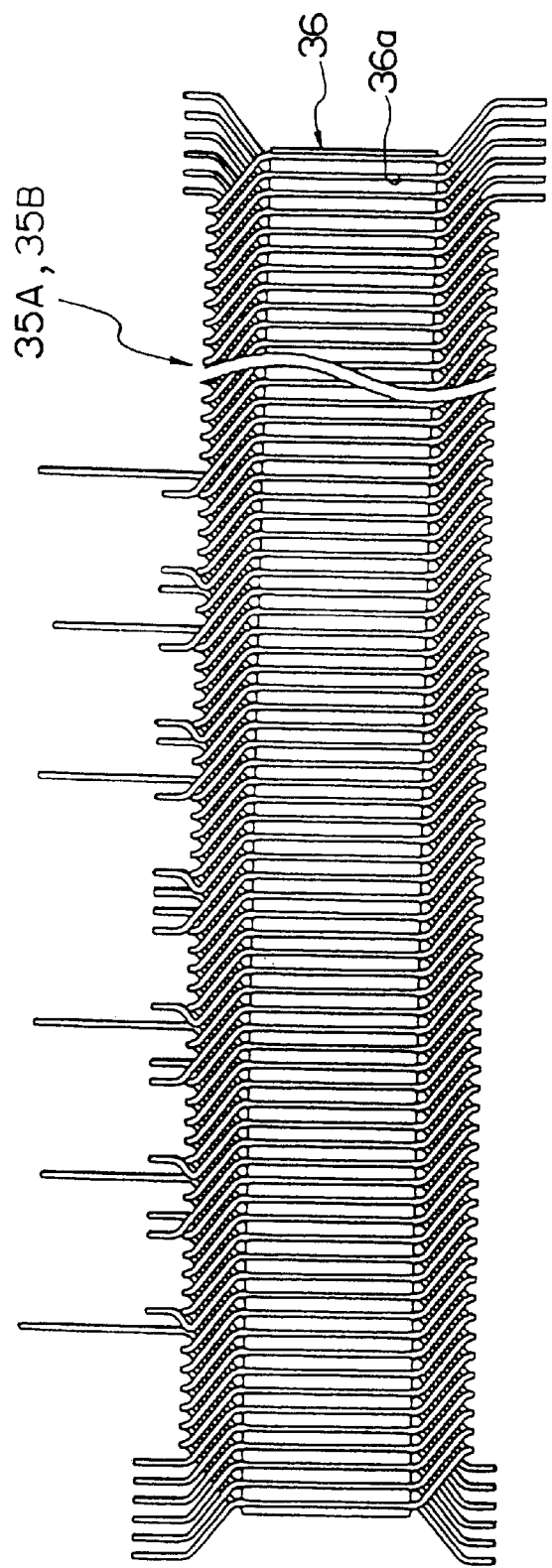
FIG. 14 is a plan showing a wire-strand group constituting part of the stator winding used in this automotive alternator mounted into the laminated core.

FIG. 1 is a cross section showing a construction of an automotive alternator according to Embodiment 1 of the present invention, FIG. 2 is a perspective showing a stator of this automotive alternator, FIG. 3 is an end elevation explaining connections in one stator winding phase group in this automotive alternator, FIG. 4 is a perspective explaining a stator winding mounted into the stator of this automotive alternator, FIG. 5 is a circuit diagram for this automotive alternator, FIGS. 6 and 7 are diagrams explaining the manufacturing process for wire-strand groups constituting part of the stator winding used in this automotive alternator, FIGS. 8A and 8B are an end elevation and a plan, respectively, showing an inner-layer wire-strand group constituting part of the stator winding used in this automotive alternator, FIGS. 9A and 9B are an end elevation and a plan, respectively, showing an outer-layer wire-strand group constituting part of the stator winding used in this automotive alternator, FIG. 10 is a perspective showing part of a strand of wire constituting part of the stator winding used in this automotive alternator, and FIG. 11 is a diagram explaining arrangement of the strands of wire constituting part of the stator winding used in this automotive alternator. FIG. 12 is a perspective showing a laminated core constituting a stator core used in this automotive alternator, FIGS. 13A, 13B, and 13C are cross sections explaining the manufacturing process for the stator used in this automotive alternator, and FIG. 14 is a plan showing a wire-strand group constituting part of the stator winding used in this automotive alternator mounted into the laminated core. Moreover, output wires, neutral-points, and crossover connections have been omitted from FIG. 4.

In FIGS. 1 and 2, a pair of pole cores 20 and 21 constituting a rotor 7 are made of iron, each has eight claw-shaped magnetic poles 22 and 23 disposed on an outer circumferential perimeter at even pitch in a circumferential direction so as to project axially, and the pole cores 20 and 21 are fastened to a shaft 6 facing each other such that claw-shaped magnetic poles 22 and 23 intermesh. In addition, fans 5 functioning as a cooling means are fastened to first and second axial ends of the rotor 7.

A stator 8 includes: a cylindrical stator core 15 formed with a number of slots 15a extending axially at a predetermined pitch in a circumferential direction; a stator winding 16 wound onto a stator core 15; electrically-insulative resin portions 25 composed of epoxy resin or the like completely embedding front-end and rear-end coil ends 16a and 16b of the stator winding 16; and insulators 19 installed in each of the slots 15a for electrically insulating the stator winding 16 from the stator core 15. The stator winding 16 includes a number of winding sub-portions in each of which one strand of wire 30 is bent back outside the slots 15a at end surfaces of the stator core 15 and wound into a wave winding so as to alternately occupy an inner layer and an outer layer in a slot depth direction within the slots 15a a predetermined number of slots apart. In this case, the stator core 15 is formed with ninety-six slots 15a at even pitch so as to house two three-phase alternating-current windings 160 (described below) such that the number of slots housing each winding phase group corresponds to the number of magnetic poles (sixteen) in the rotor 7. Long, insulated copper wire material having a rectangular cross section, for example, is used in the strands of wire 30.

Figure 22:
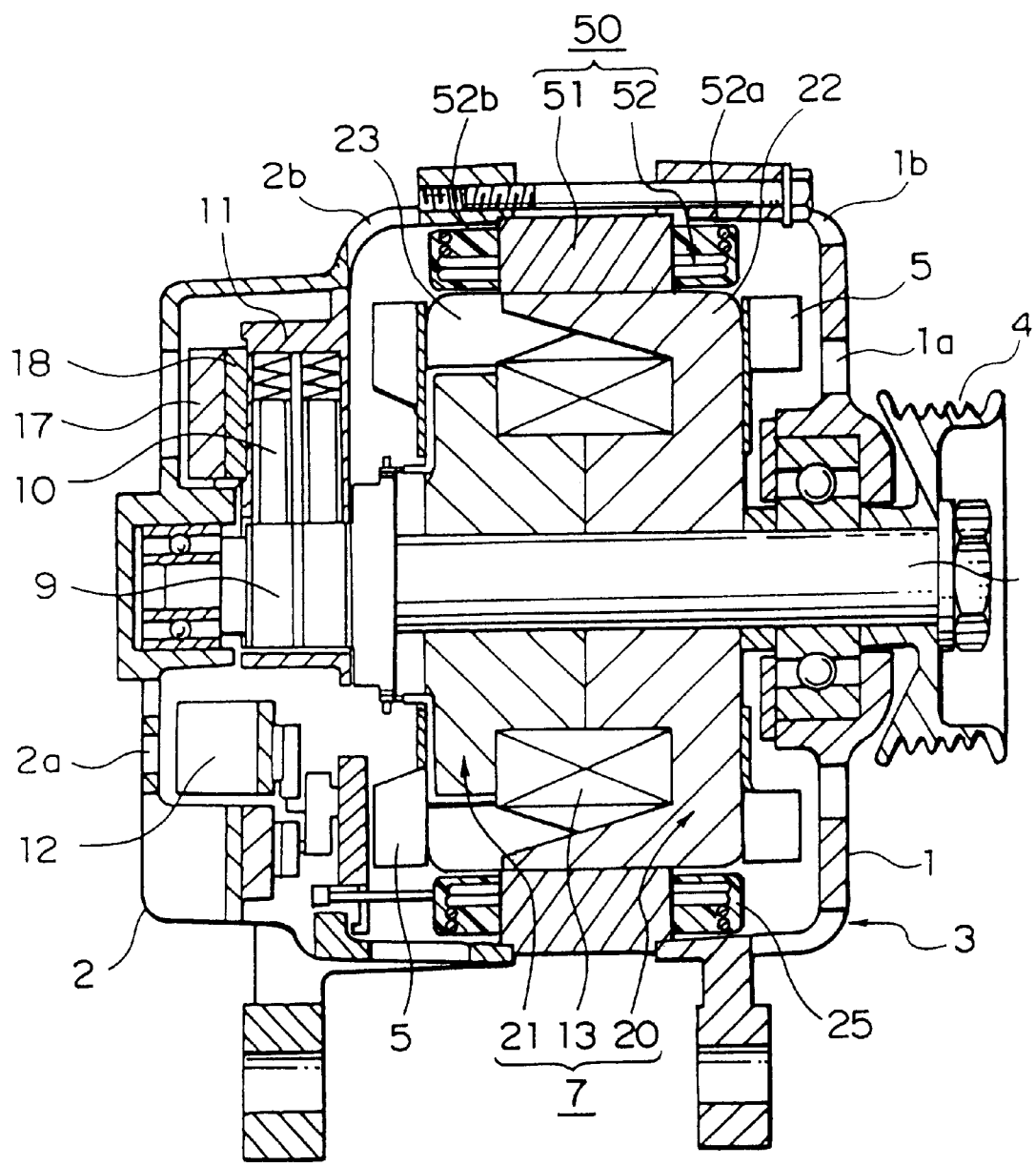
FIG. 22 is a cross section showing a conventional automotive alternator.
Figure 23:
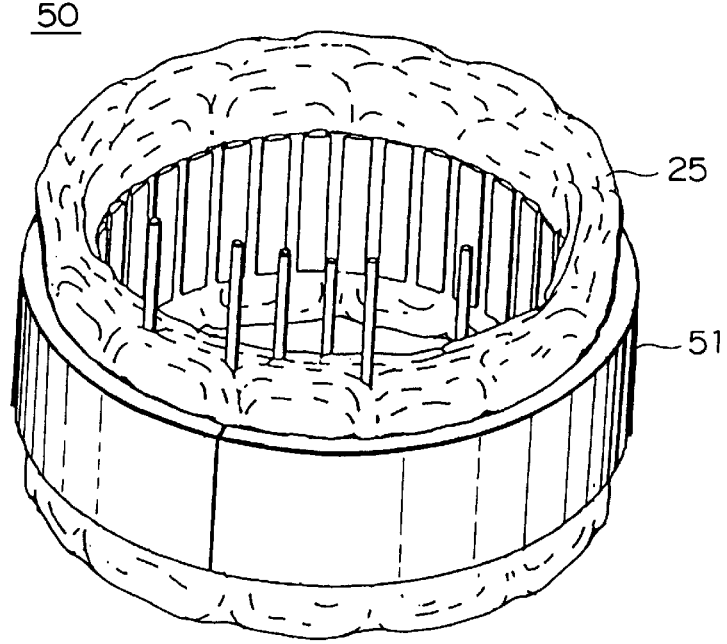
FIG. 23 is a perspective showing a stator of the conventional automotive alternator.
Figure 24:
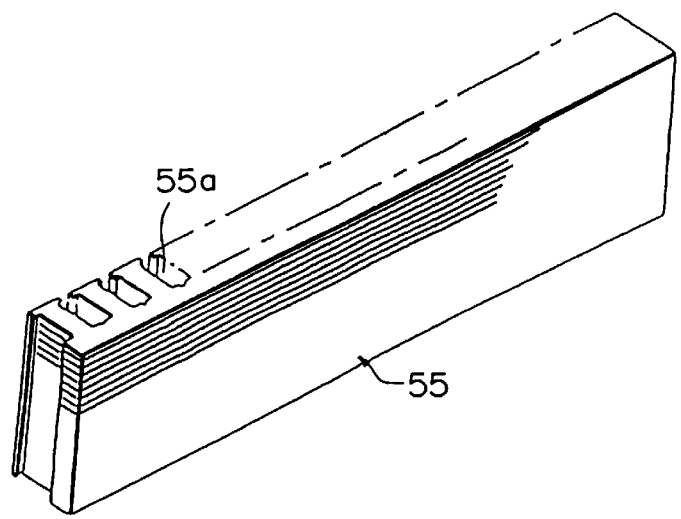
FIG. 24 is a perspective showing a laminated core constituting a stator core used in the stator of the conventional automotive alternator.
Figure 25:
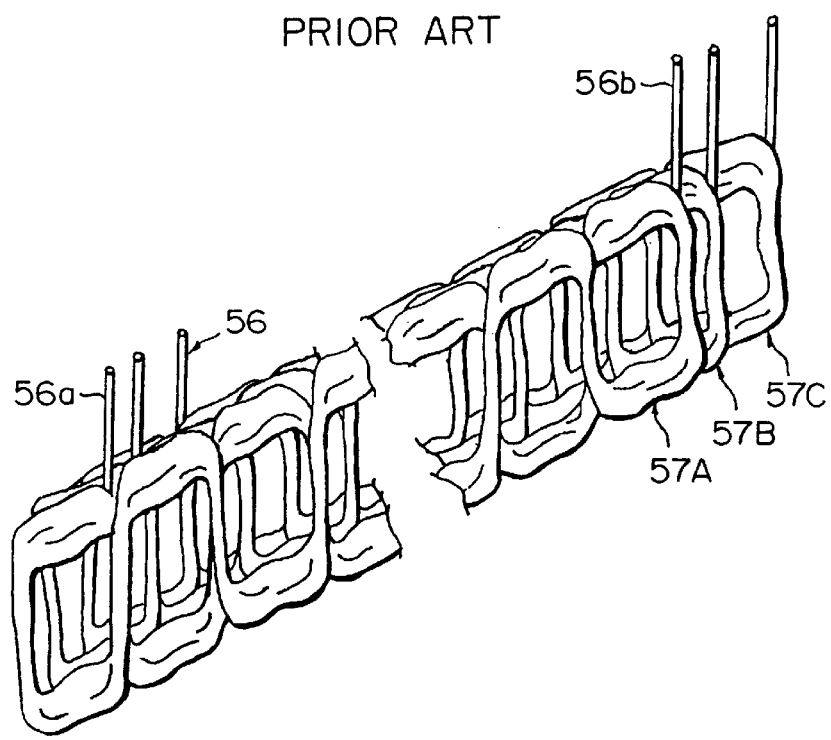
FIG. 25 is a perspective explaining the manufacturing process for the stator used in the conventional automotive alternator.
Figure 26:
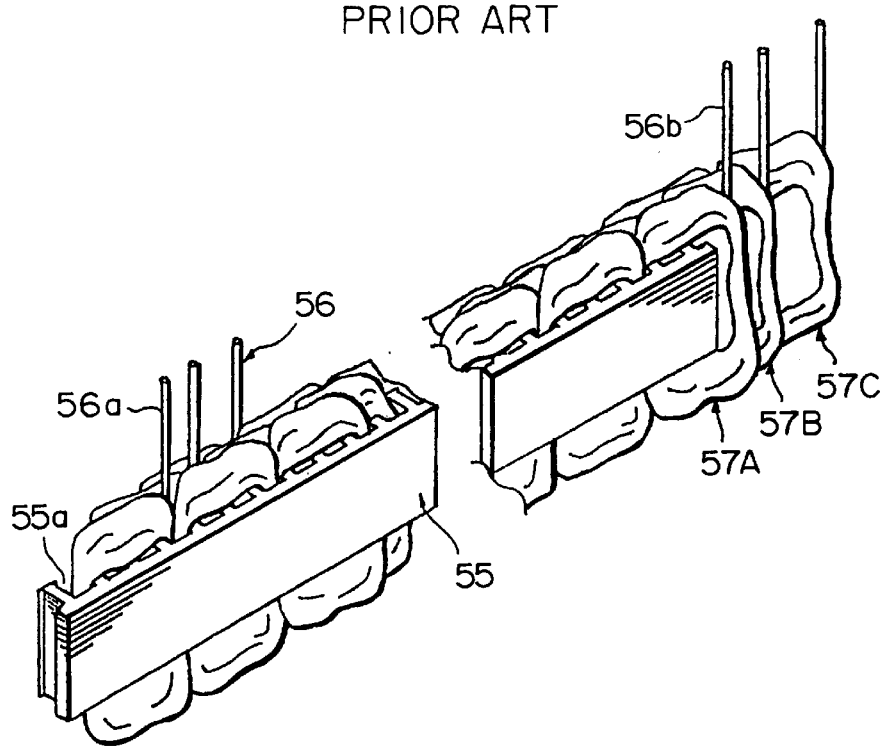
FIG. 26 is a perspective explaining the manufacturing process for the stator used in the conventional automotive alternator.
Figure 27:
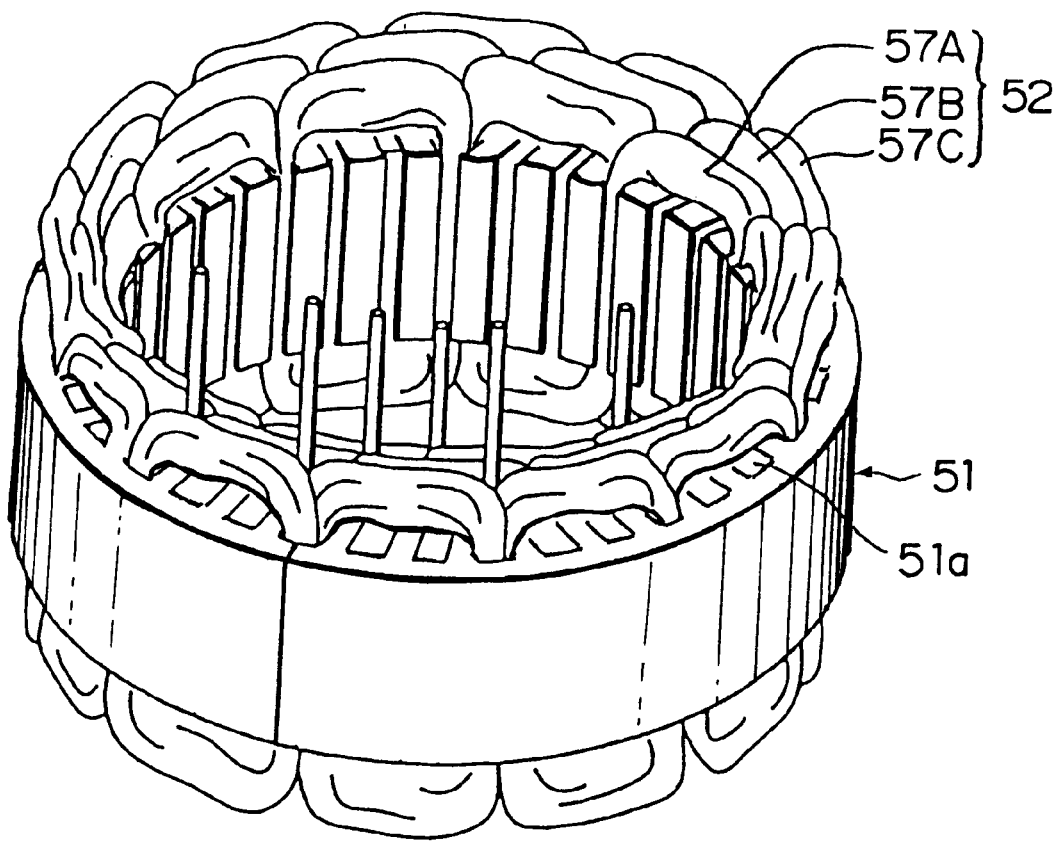
FIG. 27 is a perspective showing the stator of the conventional automotive alternator before being molded in an electrically-insulative resin.

Moreover, the rest of the construction is the same as in the conventional automotive alternator shown in FIG. 22.

Next, the winding construction of one stator winding phase group 161 will be explained in detail with reference to FIG. 3.

One stator winding phase group 161 is composed of first to fourth winding sub-portions 31 to 34 each formed from one strand of wire 30. The first winding sub-portion 31 is formed by wave winding one strand of wire 30 for one turn into every sixth slot from slot numbers 1 to 91 so as to alternately occupy a first position from an inner circumferential side and a second position from the inner circumferential side inside the slots 15a. The second winding sub-portion 32 is formed by wave winding one strand of wire 30 for one turn into every sixth slot from slot numbers 1 to 91 so as to alternately occupy the second position from the inner circumferential side and the first position from the inner circumferential side inside the slots 15a. The third winding sub-portion 33 is formed by wave winding one strand of wire 30 for one turn into every sixth slot from slot numbers 1 to 91 so as to alternately occupy a third position from the inner circumferential side and a fourth position from the inner circumferential side inside the slots 15a. The fourth winding sub-portion 34 is formed by wave winding one strand of wire 30 for one turn into every sixth slot from slot numbers 1 to 91 so as to alternately occupy the fourth position from the inner circumferential side and the third position from the inner circumferential side inside the slots 15a. The strands of wire 30 are arranged to line up in a row of four strands within each slot 15a with the longitudinal direction of their rectangular cross sections aligned in a radial direction.

Hereinafter, the first to fourth positions from the inner circumferential side inside the slots 15a in which the strands of wire 30 are housed will be called first to fourth addresses, respectively.

At a first end of the stator core 15, a first end portion 32a of the second winding sub-portion 32 extending outwards from the second address of slot number 1 and a second end portion 34b of the fourth winding sub-portion 34 extending outwards from the third address of slot number 91 are joined, and in addition, a first end portion 34a of the fourth winding sub-portion 34 extending outwards from the fourth address of slot number 1 and a second end portion 32b of the second winding sub-portion 32 extending outwards from the first address of slot number 91 are joined to form two turns of winding composed of the second and fourth winding sub-portions 32 and 34.

At a second end of the stator core 15, a first end portion 31a of the first winding sub-portion 31 extending outwards from the first address of slot number 1 and a second end portion 33b of the third winding sub-portion 33 extending outwards from the fourth address of slot number 91 are joined, and in addition, a first end portion 33a of the third winding sub-portion 33 extending outwards from the third address of slot number 1 and a second end portion 31b of the first winding sub-portion 31 extending outwards from the second address of slot number 91 are joined to form two turns of winding composed of the first and third winding sub-portions 31 and 33.

In addition, a portion of the strand of wire 30 of the third winding sub-portion 33 extending outwards at the first end of the stator core 15 from the third address of slot number 61 and the fourth address of slot number 67 is cut, and a portion of the strand of wire 30 of the fourth winding sub-portion 34 extending outwards at the first end of the stator core 15 from the third address of slot number 67 and the fourth address of slot number 73 is also cut. A first cut end 33c of the third winding sub-portion 33 and a first cut end 34c of the fourth winding sub-portion 34 are joined to form one stator winding phase group 161 having four turns connecting the first to fourth winding sub-portions 31 to 34 in series.

Moreover, the joint portion between the first cut end 33c of the third winding sub-portion 33 and the first cut end 34c of the fourth winding sub-portion 34 becomes a crossover connection connecting portion, a second cut end 33d of the third winding sub-portion 33 and a second cut end 34d of the fourth winding sub-portion 34 become an output wire (O) and a neutral-point (N), respectively.

In this stator 8, a total of six stator winding phase groups 161 are formed by offsetting the slots 15a into which the strands of wire 30 are wound one slot at a time. These six stator winding phase groups 161 constitute the stator winding 16.

Thus, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is also wound so as to alternately occupy the inner layer and the outer layer relative to the slot depth direction (the radial direction) in every sixth slot.

Turn portions 30a of the strands of wire 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form the coil ends 16a and 16b as shown in FIG. 4.

Next, the coil ends 16a and 16b of the stator winding 16 are completely embedded in the electrically-insulative resin portions 25 to obtain the stator 8 shown in FIG. 2. At this time, the electrically-insulative resin portions 25 are molded so as not to cause surface irregularities to occur which would otherwise result in discontinuities in the circumferential direction in which the turn portions 30a are arranged with predetermined gaps. In other words, rotor-facing surfaces 25a which are inner circumferential surfaces of the electrically-insulative resin portions 25 and bracket-facing surfaces 25b which are outer circumferential surfaces of the electrically-insulative resin portions 25 are each formed into smooth surfaces.

The stator 8 constructed in this manner is mounted in an automotive alternator, three stator winding phase groups 161 being connected into each of two star connections to form the two three-phase alternating-current windings 160, and each of the three-phase alternating-current windings 160 being connected to its own rectifier 12 as shown in FIG. 5. The rectifiers 12 are connected in parallel such that the direct-current output from each is combined.

Next, a method for manufacturing the stator 8 will be explained with reference to FIGS. 6 to 14.

First, as shown in FIG. 6, twelve long strands of wire 30 are simultaneously bent in the same plane to form a lightning-bolt shape. Then, an inner-layer wire-strand group 35A, shown in FIGS. 8A and 8B, is prepared by progressively folding the strand at right angles, as indicated by the arrow in FIG. 7, using a jig. In addition, an outer-layer wire-strand group 35B including crossover connections, neutral points, and output wires, as shown in FIGS. 9A and 9B, is prepared in a similar manner.

Moreover, as shown in FIG. 10, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 11. Six end portions of the strands of wire 30 each extend outwards from first and second sides at first and second ends of the wire strand groups 35A and 35B. Furthermore, the turn portions 30a are arranged so as to line up in rows on first and second side portions of the wire-strand groups 35A and 35B.

A parallelepiped laminated core 36 is prepared as shown in FIG. 12 by laminating a predetermined number of sheets of SPCC material formed with trapezoidal slots 36a at a predetermined pitch (an electrical angle of 30°) and laser welding an outer portion thereof.

As shown in FIG. 13A, the insulators 19 are mounted in the slots 36a of the parallelepiped laminated core 36, and the straight portions of the two wire-strand groups 35A and 35B are inserted so as to stack up within each of the slots 36a. Thus, the two wire-strand groups 35A and 35B are installed in the parallelepiped laminated core 36 as shown in FIG. 13B. At this time, the straight portions 30b of the strands of wire 30 are housed in a row of four in a radial direction within the slots 36a and are electrically insulated from the parallelepiped laminated core 36 by the insulators 19. The two wire-strand groups 35A and 35B are stacked one on top of the other when installed in the parallelepiped laminated core 36 as shown in FIG. 14.

Next, the parallelepiped laminated core 36 is rolled up and its ends abutted and laser welded to each other to obtain a cylindrical stator core 15, as shown in FIG. 13C. By rolling up the parallelepiped laminated core 36, the slots 36a (corresponding to the slots 15a in the stator core 15) take on a generally rectangular cross-sectional shape, and opening portions 36b of the slots 36a (corresponding to opening portions 15b of the slots 15a) become smaller than the slot-width dimensions of the straight portions 30b. Then, the end portions of each of the strands of wire 30 are connected to each other based on the connections shown in FIG. 3 to form a stator winding phase group 161. In addition, the coil ends 16a and 16b of the stator winding 16 are molded in the electrically-insulative resin portions 25 so as to be completely embedded.

In this manner, according to Embodiment 1, because the coil ends 16a and 16b are completely embedded in the electrically-insulative resin portions 25, insulation of the coil end portions is ensured and the occurrence of short-circuiting accidents due to damaging the insulating coating as a result of adjacent turn portions 30a contacting each other due to vibrations can be prevented, enabling reliability to be improved. Furthermore, the rigidity of the stator 8 is increased, enabling magnetic noise to be reduced.

Because the rotor-facing surfaces 25a of the electrically-insulative resin portions 25 are formed into smooth surfaces, wind resistance against the cooling air flowing between the electrically-insulative resin portions 25 and the rotor 7 is reduced and interference noise between the electrically-insulative resin portions 25 and the rotor 7 is minimized, enabling wind noise to be reduced.

In addition, because the bracket-facing surfaces 25b of the electrically-insulative resin portions 25 are formed into smooth surfaces, wind resistance against the cooling air flowing between the electrically-insulative resin portions 25 and each of the brackets 1 and 2 is reduced, enabling wind noise to be reduced.

The stator winding 16 includes two three-phase alternating-current windings 160, and each of the three-phase alternating-current windings 160 is constructed by alternate-connecting three stator winding phase groups 161. The stator winding phase groups 161 are constructed by connecting first to fourth winding sub-portions 31 to 34 in series. The first winding sub-portion 31 is constructed by wave winding one strand of wire 30 for one turn into every sixth slot 15*a* so as to alternately occupy the first address and the second address inside the slots 15*a*. In other words, the first winding sub-portion 31 is constructed by wave winding one strand of wire 30 for one turn into every sixth slot 15*a* so as to alternately occupy an inner layer and an outer layer in a slot depth direction. Similarly, each of the second, third, and fourth winding sub-portions 32, 33, and 34 are also constructed by wave winding one strand of wire 30 for one turn into every sixth slot 15*a* so as to alternately occupy an inner layer and an outer layer in a slot depth direction.

Thus, the turn portions 30*a* of the strands of wire 30 constituting the first and second winding sub-portions 31 and 32 can be formed into a generally identical shape, and the turn portions 30*a* thereof can be arranged neatly in rows so as to stack up in a circumferential direction. Similarly, the turn portions 30*a* of the strands of wire 30 constituting the third and fourth winding sub-portions 33 and 34 can be formed into a generally identical shape, and the turn portions 30*a* thereof can be arranged neatly in rows so as to stack up in a circumferential direction on the outer circumferential side of the first and second winding sub-portions 31 and 32. In other words, the turn portions 30*a* have a generally identical shape in the circumferential direction, and spaces between the turn portions 30*a* are generally identical in the circumferential direction.

By adopting the present winding construction, the coil ends 16*a* and 16*b* can easily be molded uniformly into the electrically-insulative resin portions 25 around the entire circumference, enabling the electrically-insulative resin portions 25 to be formed with generally uniform circumferential and axial distributions. Thus, the heat dissipation of the coil end portions including the electrically-insulative resin portions 25 becomes uniform and deterioration of the cooling of the stator winding 16 is suppressed, enabling temperature increases in the stator winding 16 to be suppressed.

Furthermore, by adopting the present winding construction, the rotor-facing surfaces 25*a* and the bracket-facing surfaces 25*b* of the electrically-insulative resin portions 25 can easily be formed into smooth surfaces.

By adopting the present winding construction, the strands of wire 30 can be installed at a high density, enabling output to be improved, and the amount of resin in the electrically-insulative resin portions 25 can be reduced compared to the conventional stator 50, enabling costs to be reduced.

Four strands of wire 30 are arranged so as to line up in a row radially within each slot 15*a*, and the turn portions 30*a* are arranged to line up in two rows circumferentially. Thus, the turn portions 30*a* constituting the coil ends 16*a* and 16*b* are each divided into two rows radially, enabling the height to which the coil ends 16*a* and 16*b* extend outwards from the stator core 15 to be reduced. As a result, the height of the electrically-insulative resin portions 25 molded over the coil ends 16*a* and 16*b* can be decreased and wind resistance at the electrically-insulative resin portions 25 can be reduced, enabling the reduction of wind noise due to the rotation of the rotor 7, and coil end leakage reactance is also reduced, improving output and efficiency.

Because the coil ends 16*a* and 16*b* are disposed in close proximity to the fans 5 downstream from the fans 5, the cooling airflow flowing through air passages due to the action of the fans 5 contributes to the cooling of the electrically-insulative resin portions 25 into which the coil ends 16*a* and 16*b* are molded, enabling the cooling of the stator winding 16 to be improved.

The rotor 7 has sixteen magnetic poles, and ninety-six (96) slots 15*a* are formed at even pitch in the stator core 15. Because the strands of wire 30 are wave wound into every sixth slot 15*a*, the pitch of the slots into which the strands of wire 30 are wound corresponds to the pitch between the N and S poles of the rotor 7, making the stator winding 16 a full-pitch winding. Thus, maximum torque can be obtained, enabling the achievement of increased output.

Because the open dimensions of the opening portions 15*b* of the slots 15*a* are constructed so as to be smaller than the dimensions of the strands of wire 30 in the width direction of the slots 15*a*, the strands of wire 30 are prevented from dislodging the slots 15*a* towards the radial inside and noise at the opening portions 15*b* due to interference with the rotor 7 can be reduced.

Because the straight portions 30*b* are formed with a rectangular cross section, the cross-sectional shape of the straight portions 30*b* fits neatly into the shape of the slots 15*a* when the straight portions 30*b* are housed inside the slots 15*a*. Thus, the space factor of the strands of wire 30 inside the slots 15*a* is easily increased, enabling improved transfer of heat from the strands of wire 30 to the stator core 15. Here in Embodiment 1, the straight portions 30*b* are formed with a rectangular cross section, but the cross-sectional shape of the straight portions 30*b* may be any generally rectangular shape which fits neatly into the generally rectangular shape of the slots. This generally rectangular shape is not limited to a true rectangular shape and may be a square shape, a shape consisting of four flat surfaces with rounded corners, or an elongated elliptical shape in which the short sides of the rectangle are made into arcs, etc.

Because the strands of wire 30 are formed with a rectangular cross section, the surface area radiating heat from the turn portions 30*a* constituting the coil ends is increased, efficiently radiating heat generated in the stator winding 16.

As shown in FIG. 5, three stator winding phase groups 161, which are formed by connecting the first to fourth winding sub-portions 31 to 34 in series, are each connected into star connections to form the two three-phase alternating-current windings 160, each of the three-phase alternating-current windings 160 is connected to its own rectifier 12, and the two rectifiers 12 are connected in parallel. Thus, the direct-current outputs of two three-phase alternating-current windings 160 which each have four turns can be combined and extracted, enabling elimination of power generation deficiency in low rotational frequency regions.

By adopting the present winding construction, increases in the number of turns in the stator winding can be easily adapted to by lining up the straight portions 30*b* of the wire-strand group 35 (35A and 35B) which are composed of continuous strands of wire and installing them into the stator core 15 so that they stack up on top of each other.

The stator 8 according to Embodiment 1 can be prepared by inserting the wire-strand group 35 which is composed of continuous wire into the slots 36*a* in the parallelepiped laminated core 36 through the opening portions 36*b* and then rolling the parallelepiped laminated core 36 into an annular shape. Thus, because the open dimensions of the opening portions 36*b* of the slots 36*a* can be made larger than the dimensions of the strands of wire 30 in the width direction of the slots, the operation of inserting the wire-strand group 35 is improved. Furthermore, because the open dimensions of the opening portions 36*b* of the parallelepiped laminated core 36 can be made smaller than the dimensions of the strands of wire 30 in the width direction of the slots when the parallelepiped laminated core 36 is rolled up, the space factor is increased, enabling output to be improved. In addition, even if the number of slots is increased, the productivity of the stator will not deteriorate.

Because the shapes of both of the coil ends 16a and 16b (the electrically-insulative resin portions 25 molding the two coil ends 16a and 16b) are generally identical and the fans 5 are disposed on both axial ends of the rotor 7, both coil ends 16a and 16b are cooled in a balanced manner, reducing the stator winding temperature uniformly and significantly.

Now, the fans 5 do not have to be disposed on both ends of the rotor 7, they may be disposed in consideration of the positions of the stator winding or the rectifiers which are large heat-generating bodies. For example, the coil ends of the stator winding which are large heat-generating bodies can be disposed on the discharge side of a fan with a large cooling speed and a fan may be disposed on an end portion of the rotor at the end where the rectifiers are disposed. Furthermore, when mounted to an automotive engine, because the pulley is normally connected to a crankshaft by means of a belt, the fan may be disposed at the end away from the pulley so that the cooling exhaust from the fan does not affect the belt. Moreover, shoulder portions of the claw-shaped magnetic poles of the rotor have a wind conveying action, and can be used as a cooling means.

Because the axial length of the stator 8 including the electrically-insulative resin portions 25 is shorter than the axial length of the pole cores 20 and 21, compactness can be achieved. When the fans 5 are disposed on both axial end portions of the rotor 7, because there are no electrically-insulative resin portions 25 on the discharge side of the fans, wind resistance is significantly reduced, thereby reducing wind noise and suppressing temperature increases in internal parts requiring cooling, such as the rectifiers 12.

The number of slots housing the stator winding 16 is two per pole per phase, and there are two three-phase alternating-current windings 160 each corresponding to the number of slots per pole per phase. Thus, the magnetomotive wave form can be made to approximate a sinusoidal wave, reducing higher harmonic wave components and ensuring stable output. Because the number of slots 15a is increased, teeth in the stator core 15 are slender, reducing magnetic leakage through teeth straddling different facing claw-shaped magnetic poles 22 and 23, enabling pulsation in output to be suppressed. Furthermore, because a greater number of slots 15a means a correspondingly greater number of turn portions 30a, heat dissipation from the coil ends is improved.

Because the slots 15a and the opening portions 15b are arranged to be evenly spaced at an electrical angle of 30°, magnetic pulsation which result in excitation forces which cause magnetic noise can be reduced.

EMBODIMENT 2

Figure 15:
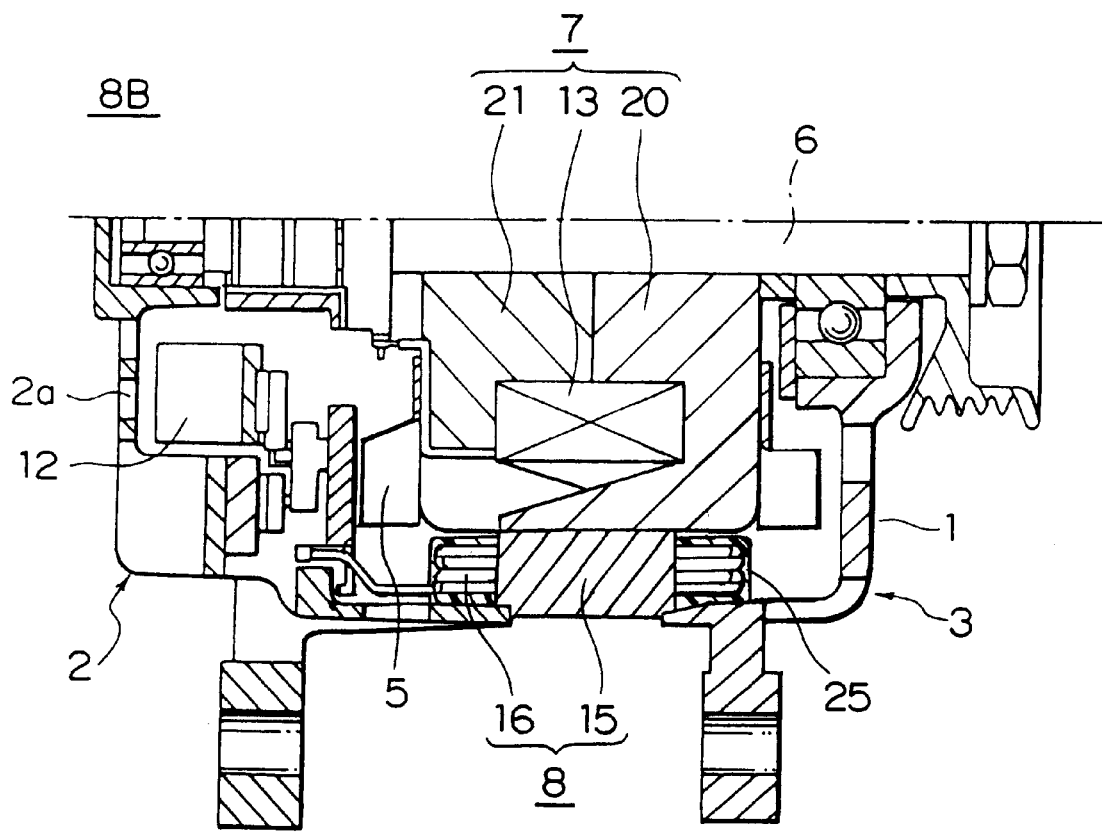
FIG. 15 is a partial cross section showing an automotive alternator according to Embodiment 2 of the present invention.

In Embodiment 2, as shown in FIG. 15, the bracket-facing surfaces 25b of the electrically-insulative resin portions 25 are disposed in close contact with inner wall surfaces of the front and rear brackets 1 and 2 of the rotor 8. Moreover, the rest of the construction is the same as in Embodiment 1 above.

According to Embodiment 2, because the bracket-facing surfaces 25b of the electrically-insulative resin portions 25 are disposed in close contact with inner wall surfaces of the front and rear brackets 1 and 2, heat generated in the coil ends 16a and 16b is efficiently transferred to the low-temperature brackets 1 and 2 through the electrically-insulative resin portions 25, improving the cooling of the stator winding 16 and enabling reductions in the size of the alternator proportionate to the reductions in gaps between the electrically-insulative resin portions 25 and the inner wall surfaces of the brackets 1 and 2.

EMBODIMENT 3

Figure 16:
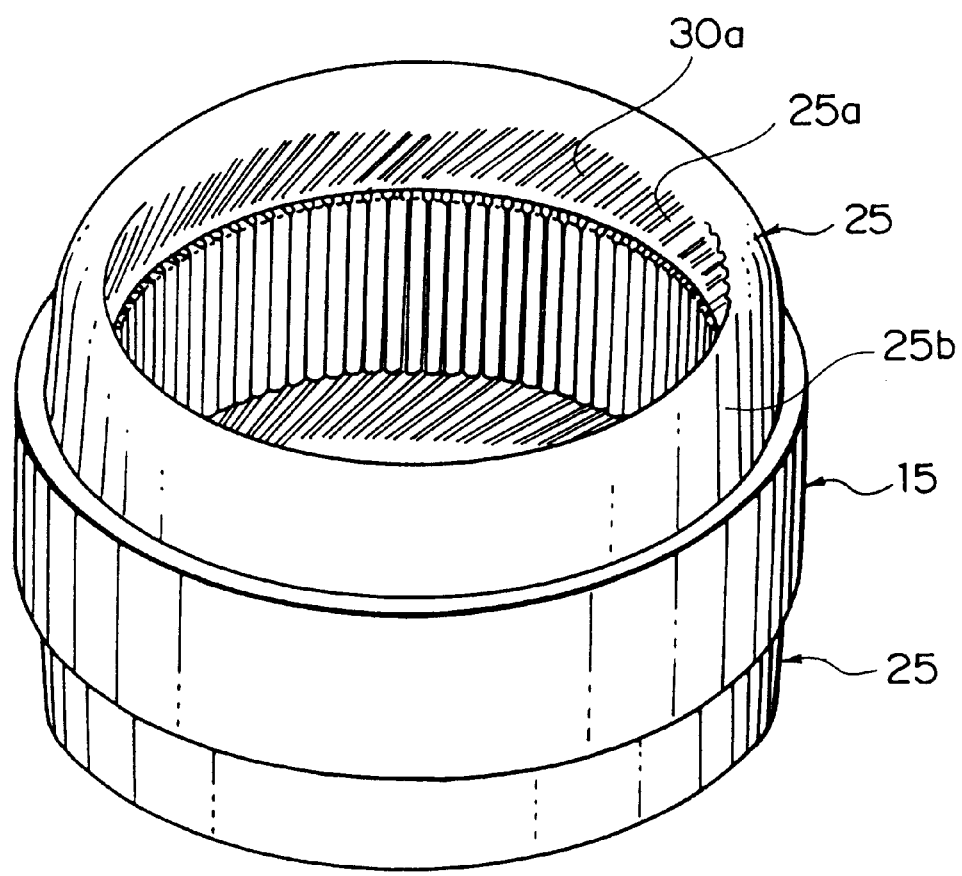
FIG. 16 is a perspective showing a stator of an automotive alternator according to Embodiment 3 of the present invention.

In Embodiment 3, as shown in FIG. 16, some outer surfaces (surfaces facing the rotor 7) of the turn portions 30a of the strands of wire 30 constituting the inner layer are positioned in the same plane as the rotor-facing surfaces 25a of the electrically-insulative resin portions 25 so as to be exposed. Moreover, the rest of the construction is the same as in Embodiment 1 above.

In Embodiment 3, because the cooling air contacts the exposed surfaces of the turn portions 30a of the strands of wire 30, heat generated in the coil ends 16a and 16b is efficiently radiated from the exposed surfaces of the turn portions 30a, improving the cooling of the stator winding 16.

Here, if the strands of wire 30 are formed with a rectangular cross section, it is easy to define the plane in which the strands of wire are exposed on the rotor-facing surfaces 25a of the electrically-insulative resin portions 25, but even if the strands of wire have a circular cross section, the same effect can be achieved as long as some side surfaces of the strands of wire are exposed.

Moreover, in Embodiment 3 above, the surfaces of the turn portions 30a of the strands of wire 30 constituting the inner layer facing the rotor 7 are positioned in the same plane as the rotor-facing surfaces 25a of the electrically-insulative resin portions 25 so as to be exposed, but outer surfaces (surfaces facing the brackets 1 and 2) of the turn portions 30a of the strands of wire 30 constituting the outer layer may be positioned in the same plane as the bracket-facing surfaces 25b of the electrically-insulative resin portions 25.

EMBODIMENT 4

Figure 17:
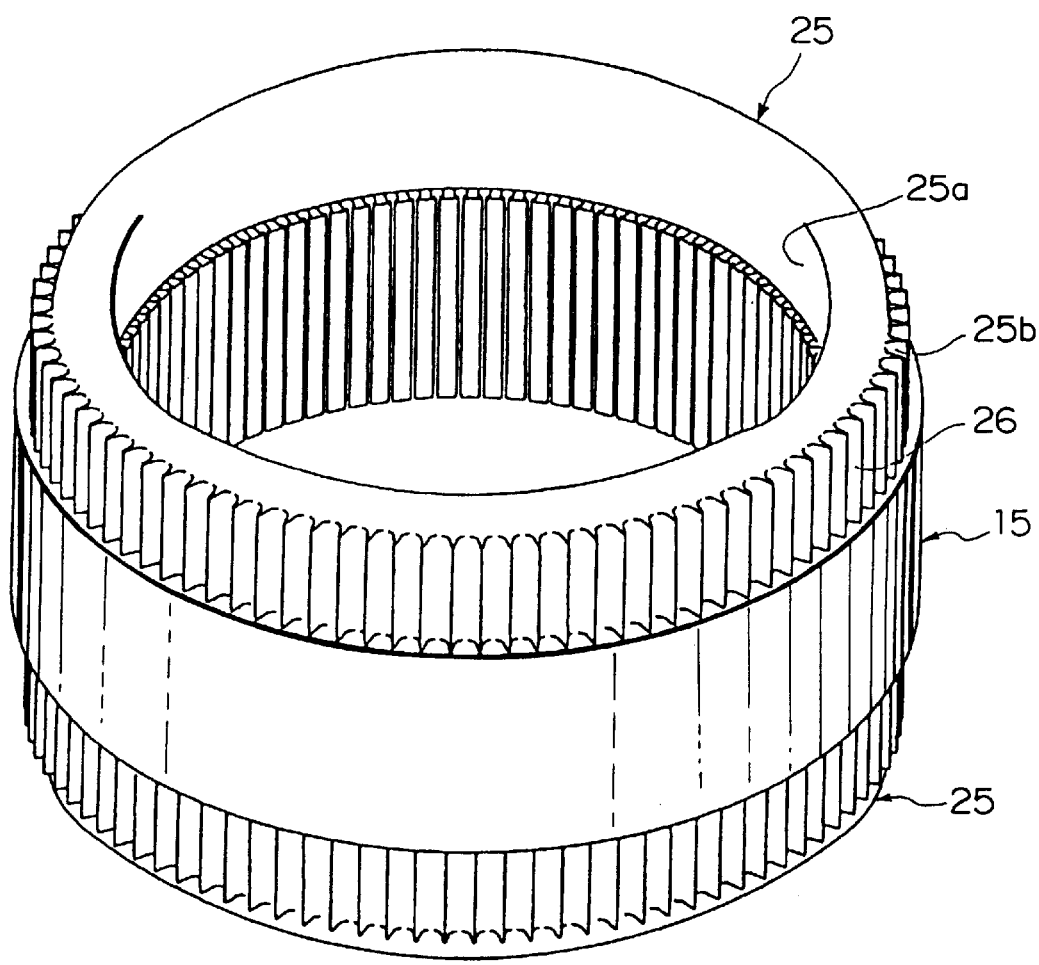
FIG. 17 is a perspective showing a stator of an automotive alternator according to Embodiment 4 of the present invention.

In Embodiment 4, as shown in FIG. 17, fins 26 are disposed on the bracket-facing surfaces 25b of the electrically-insulative resin portions 25. Moreover, the rest of the construction is the same as in Embodiment 1 above.

According to Embodiment 4, because the cooling air flows between the fins 26, heat generated in the coil ends 16a and 16b is transferred through the electrically-insulative resin portions 25 to the fins 26 and is radiated from the fins 26 to the cooling air, improving the cooling of the stator winding 16.

EMBODIMENT 5

Figure 18:
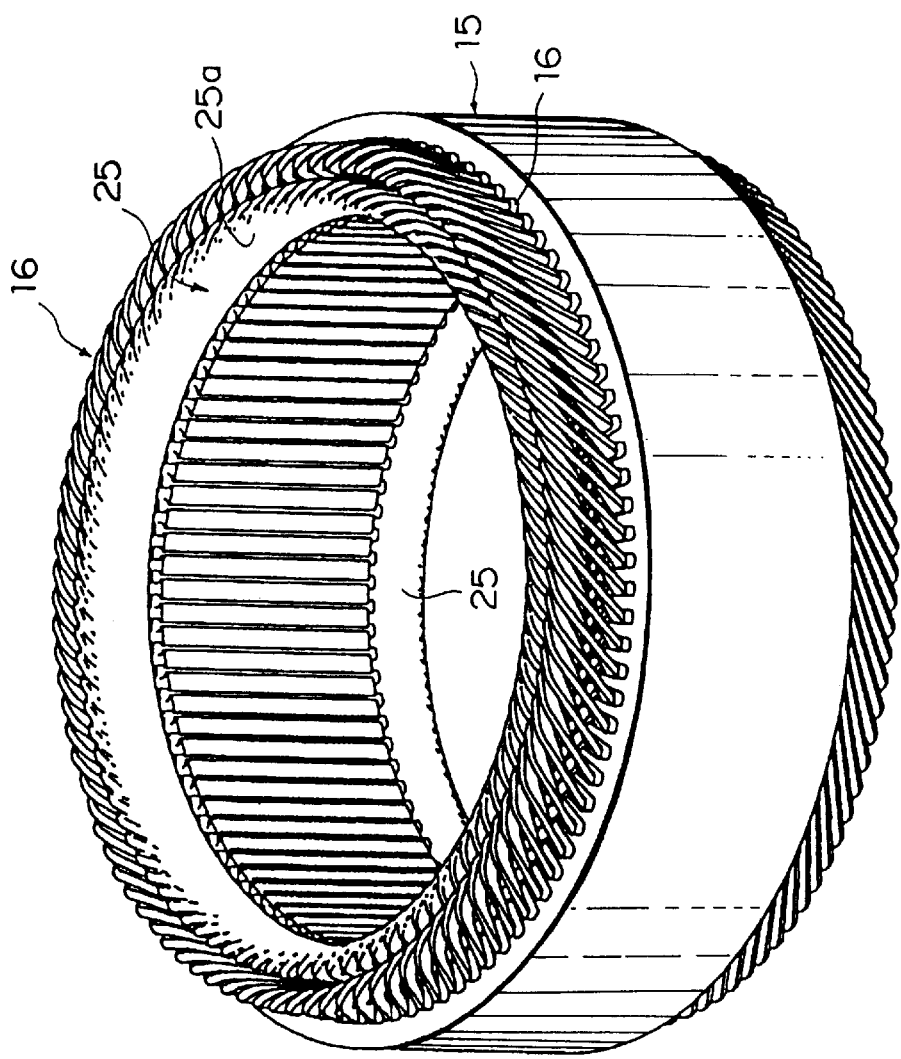
FIG. 18 is a perspective showing a stator of an automotive alternator according to Embodiment 5 of the present invention.

In Embodiment 5, as shown in FIG. 18, the electrically-insulative resin portions 25 are disposed so as to smoothly cover only inner circumferential sides (sides facing the rotor 7) of the turn portions 30a of the strands of wire 30 constituting the inner layer. Moreover, the rest of the construction is the same as in Embodiment 1 above.

According to Embodiment 5, because the rotor-facing surfaces 25a of the electrically-insulative resin portions 25 are formed into smooth surfaces, wind noise resulting from interference noise arising between the electrically-insulative resin portions 25 and the rotor 7 is reduced. In addition, because apex portions and outer circumferential sides of the turn portions 30a of the strands of wire 30 constituting the inner layer and the turn portions 30a of the strands of wire 30 constituting the outer layer are exposed, the exposed turn portions 30a are in direct contact with the cooling air, further improving the cooling of the stator winding 16.

Moreover, in Embodiment 5 above, if some surfaces facing the rotor 7 of the turn portions 30a of the strands of wire 30 constituting the inner layer are positioned in the same plane as the rotor-facing surfaces 25a of the electrically-insulative resin portions 25 so as to be exposed, the cooling of the stator winding 16 can be further improved.

EMBODIMENT 6

Figure 19:
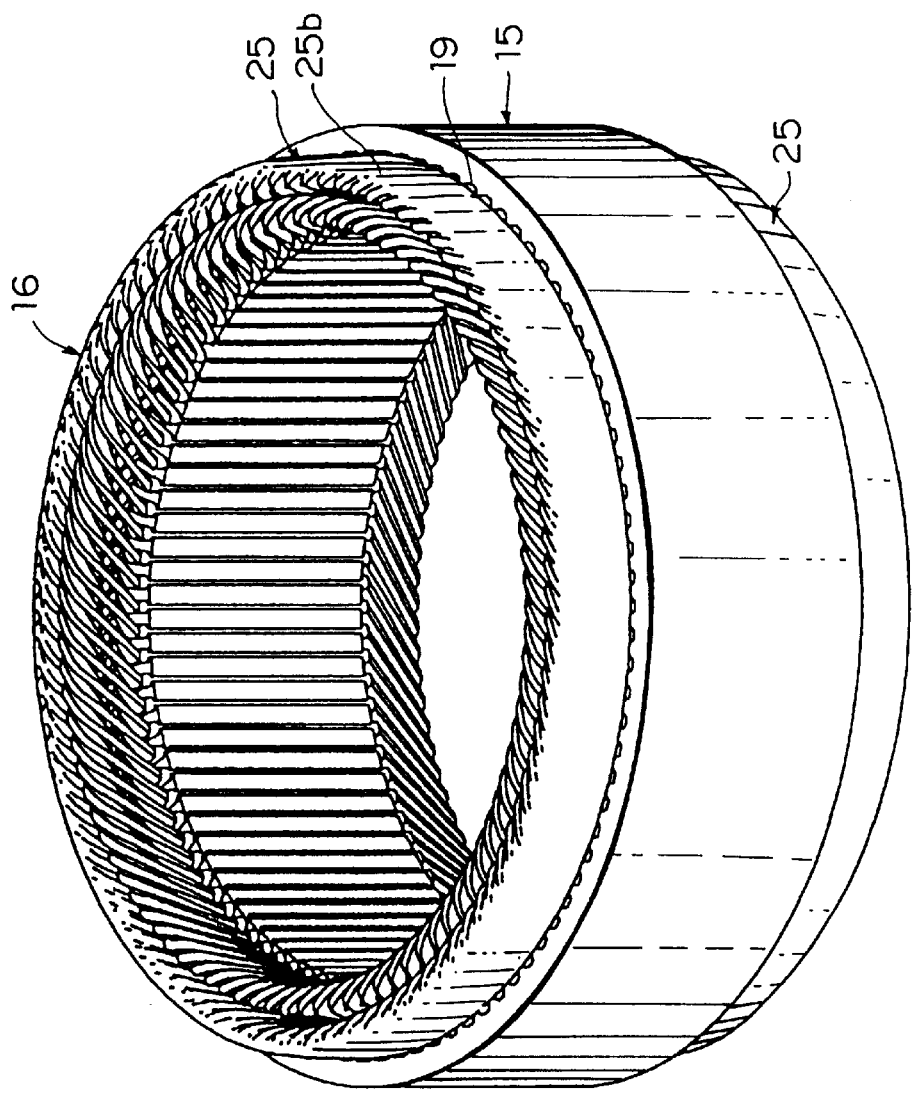
FIG. 19 is a perspective showing a stator of an automotive alternator according to Embodiment 6 of the present invention.

In Embodiment 6, as shown in FIG. 19, the electrically-insulative resin portions 25 are disposed so as to smoothly cover only outer circumferential sides (sides facing the brackets 1 and 2) of the turn portions 30a of the strands of wire 30 constituting the outer layer. Moreover, the rest of the construction is the same as in Embodiment 1 above.

According to Embodiment 6, because the bracket-facing surfaces 25b of the electrically-insulative resin portions 25 are formed into smooth surfaces, wind resistance in the airflow passages between the electrically-insulative resin portions 25 and the inner wall surfaces of the brackets 1 and 2 is reduced, enabling wind noise to be reduced. In addition, because apex portions and inner circumferential sides of the turn portions 30a of the strands of wire 30 constituting the outer layer and the turn portions 30a of the strands of wire 30 constituting the inner layer are exposed, the exposed turn portions 30a are in direct contact with the cooling air, further improving the cooling of the stator winding 16.

Moreover, in Embodiment 6 above, the bracket-facing surfaces 25b of the electrically-insulative resin portions 25 may also be disposed in close contact with the inner wall surfaces of the brackets 1 and 2. In that case, the exposed turn portions 30a are in direct contact with the cooling air, radiating heat generated in the stator winding 16, and because heat generated in the stator winding 16 is also transferred to the low-temperature brackets 1 and 2 through the electrically-insulative resin portions 25, the cooling of the stator winding 16 is increased even further. In Embodiment 1 where the electrically-insulative resin portions 25 were molded so as to completely cover the coil ends 16a and 16b, the number of turns of the strands of wire had to be reduced in proportion to the space occupied by the resin portions, creating a risk that output would be insufficient. In Embodiment 6, however, because the electrically-insulative resin portions 25 are not disposed on the apex portions and inner circumferential sides of the turn portions 30a of the strands of wire 30 constituting the outer layer and on the turn portions 30a of the strands of wire 30 constituting the inner layer, the number of turns of the strands of wire 30 can be increased proportionately, enabling output to be improved.

EMBODIMENT 7

Figure 20:
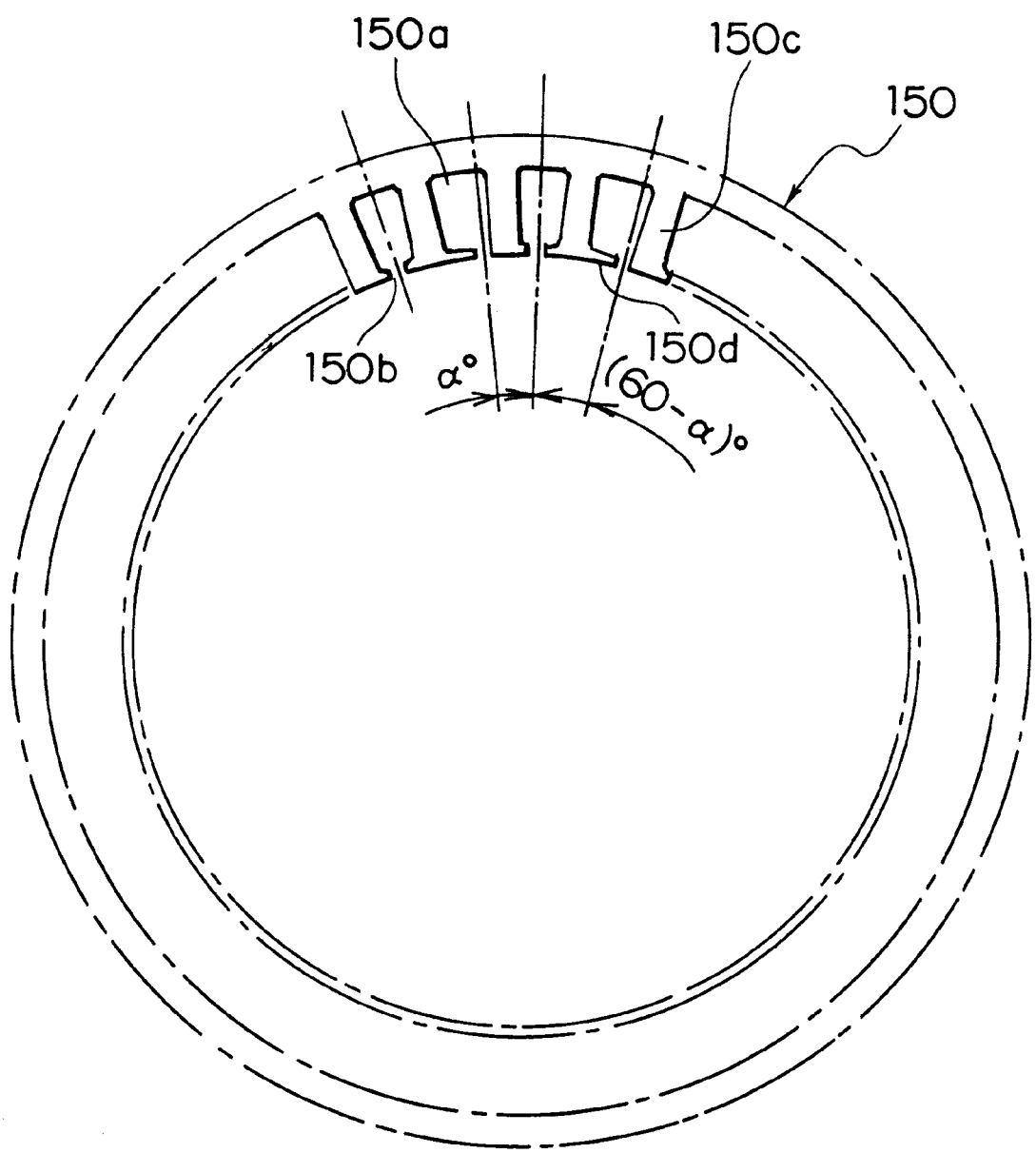
FIG. 20 is a perspective showing a stator core of an automotive alternator according to Embodiment 7 of the present invention.

In Embodiment 7, as shown in FIG. 20, slots 150a in a stator core 150 are formed at even pitch, and circumferential air-gap centers of slot opening portions 150b are disposed at a non-uniform pitch so as to alternate between an electrical angle of $\alpha°$ and an electrical angle of $(60-\alpha)°$. Here, $\alpha$ is not equal to 30 ($\alpha \neq 30$). Moreover, the rest of the construction is the same as in Embodiment 1 above.

Figure 21:
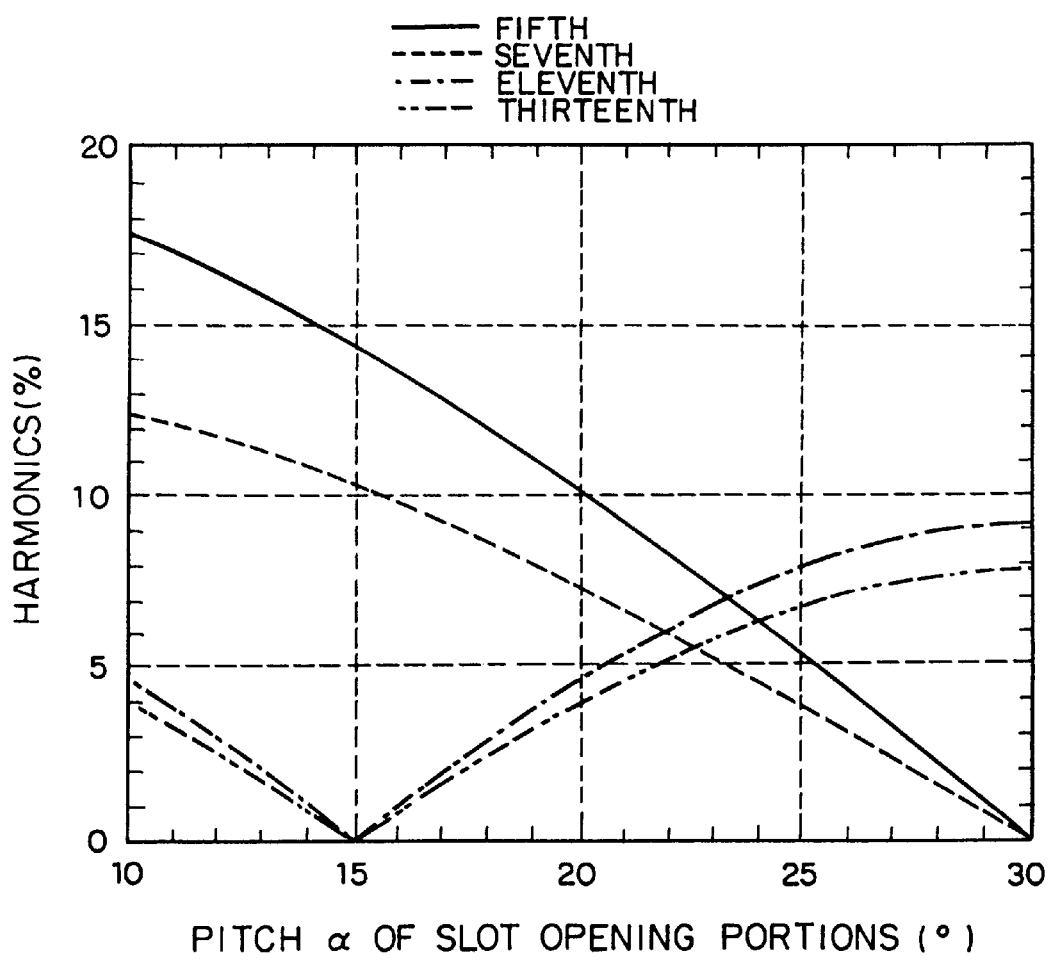
FIG. 21 is a graph showing output characteristics of the automotive alternator according to Embodiment 7 of the present invention.

According to Embodiment 7, because the circumferential air-gap centers of the slot opening portions 150b are disposed so as to alternate between an electrical angle of $\alpha°$ and an electrical angle of $(60-\alpha)°$, the two three-phase alternating current windings 160 are installed so as to have a mutual phase difference of $(60-\alpha)°$. Now, stators with different values for $\alpha$ were installed in an alternator and the measured results for changes in various order components of stator magnetomotive harmonic frequencies which give rise to magnetic noise are shown in FIG. 21. Moreover, $\alpha$ is varied by adjusting circumferential lengths of flange portions 150d disposed on ends of tooth portions 150c.

From FIG. 21, it can be seen that if the pitch between the circumferential air-gap centers of the adjacent slot opening portions 150b is within a range between nonuniform pitch alternating between 16° and 44° and a nonuniform pitch alternating between 29° and 31°, the fifth, seventh, eleventh and thirteenth magnetomotive harmonic frequencies of the stator can be kept below a maximum value of 13 percent.

In addition, it can be seen that if the pitch between the circumferential air-gap centers of the adjacent slot opening portions 150b is within a range between a nonuniform pitch alternating between 22° and 38° and a nonuniform pitch alternating between 24° and 36°, the fifth, seventh, eleventh and thirteenth magnetomotive harmonic frequencies of the stator can be kept below a maximum value of 8 percent, that is to say, the fifth, seventh, eleventh and thirteenth magnetomotive harmonic frequencies of the stator can be reduced in a balanced manner.

Moreover, in each of the above embodiments, an epoxy resin has been used for the electrically-insulative resin portions 25, but a resin into which a component having higher thermal conductivity than the principal component of the resin has been mixed may also be used for the electrically-insulative resin portions. For example, a resin containing a mixture of epoxy resin (principal component) having a thermal conductivity of 0.5 (W/mk) and alumina having a thermal conductivity of 3.5 (W/mk) in a ratio of one to four (1:4) may also be used for the electrically-insulative resin portions. In that case, because heat generated in the stator winding 16 is quickly transferred through the electrically-insulative resin portions to the surface of the electrically-insulative resin portions and is radiated from the surface of the electrically-insulative resin portions, the cooling of the stator winding 16 can be improved.

Furthermore, in each of the above embodiments, the fans 5 are disposed inside the case 3, but a fan may also be disposed outside the automotive alternator so as to rotate together with the rotation of the rotor.

Each of the above embodiments has been explained for cases where each of the stator winding phase groups 161 has four turns, but the number of turns in the stator winding 161 is not limited to four turns. When even lower-speed output is required six turns or eight turns may be used in the stator winding phase groups 161. Such cases can also be adapted to simply by inserting winding groups into the stator core so as to stack up radially. Naturally, odd numbers of turns may also be used.

Each of the above embodiments has been explained for use in an alternator with full-pitch windings, but the present constructions may also be used in an alternator with short-pitch windings (i.e., not full-pitch windings).

The present invention can also be used in automotive alternators of the type in which the rotor coil is secured to a bracket and a rotating magnetic field is supplied across an air gap.

In each of the above embodiments, the number of slots in the stator was ninety-six slots for sixteen magnetic poles, but three phases and seventy-two slots for twelve magnetic poles, three phases and 120 slots for twenty poles, etc., may also be adopted. Furthermore, in the case of one slot per pole per phase, there may also be forty-eight slots for sixteen poles, thirty-six slots for twelve poles, sixty slots for twenty poles, etc.

In each of the above embodiments, the axial length of the stator including the coil ends was shorter than the axial length of the rotor, but the present invention may also be used in an alternator constructed such that the axial length of the stator including the coil ends is longer than the axial length of the rotor. In that case, because the coil ends are disposed on the discharge side of the fans, temperature increases in the stator can be suppressed.

Each of the above embodiments used a Lundell-type rotor having claw-shaped magnetic poles, but the same effects can be achieved using a salient-type rotor having projecting magnetic poles.

In each of the above embodiments, the rectifiers are disposed at the end of the rotor away from the pulley and the fan is disposed at the same end, but the fan may also be disposed at the end near the pulley when there is no particular problem with the temperature of the rectifiers. Because the height of the coil ends of the stator is low, wind resistance on the discharge side in the wind channel of the fan is significantly reduced, increasing the overall amount of cooling air. Consequently, suitable relative positions for the rectifiers, the pulley, and the fans may also be selected in consideration of the position where the alternator is mounted on the engine, of wind noise, of magnetic noise, and of the temperature conditions of each portion.

In each of the above embodiments, the insulators are inserted on the laminated core side before the insertion of the wire-strand groups into the laminated core, but the insulators may also first be wrapped around the portions of the strands of wire to be housed in the slots and inserted into the laminated core together with the wire-strand groups. Furthermore, a long strip of insulators may be placed on top of the parallelepiped laminated core and the wire-strand groups may be inserted from above such that the insulators are simultaneously inserted into and housed inside the slots together with the wire-strand groups. In that case, at a later stage, the protruding insulators may be removed together in one step. In addition, the portions of the strands of wire to be housed in the slots may be pre-molded with an insulating resin. In that case, mass-productivity is significantly improved.

In each of the above embodiments, copper wire material having a rectangular cross section is used in the strands of wire, but the strands of wire are not limited to copper wire material having a rectangular cross section, and may, for example, be copper wire material having a circular cross section. In that case, formability of the strands of wire is enhanced, facilitating easy placement and connection of the strands of wire, and improving the workability. Further, the strands of wire are not limited to copper wire material, and may, for example, be aluminium wire material.

In each of the above embodiments, four strands of wire are arranged so as to line up in a row radially within each slot and the turn portions are arranged to line up in two rows circumferentially, but six strands of wire may be arranged so as to line up in a row radially within each slot and the turn portions may be arranged to line up in three rows circumferentially or eight strands of wire may be arranged so as to line up in a row radially within each slot and the turn portions are arranged to line up in four rows circumferentially. Because the more the number of the strands of wire lined up in a row radially within each slot and the number of the rows of the turn portions lined up circumferentially increase the more the number of the connection portions increase, the present invention can be used for the construction such that a large number of the strands of wire are arranged so as to line up in a row radially within each slot and the turn portions are arranged to line up in a large number of rows circumferentially.

The present invention is constructed in the above manner and exhibits the effects described below.

According to one aspect of the present invention, there is provided an alternator including:
    a rotor for forming north-seeking (N) and south-seeking (S) poles about a rotational circumference;
    a stator including:
        a stator core disposed facing the rotor; and
        a stator winding installed in the stator core;
    a bracket supporting the rotor and the stator; and
    a cooling means for cooling the stator winding by moving together with the rotor and generating a flow of cooling air inside the bracket,
wherein
    the stator core includes a laminated core formed with a number of slots extending axially at a predetermined pitch in a circumferential direction,
    the stator winding includes a number of winding sub-portions in each of which a long strand of wire is wound so as to alternately occupy an inner layer and an outer layer in a slot depth direction within the slots at intervals of a predetermined number of slots, the strand of wire folding back outside the slots at first and second axial end surfaces of the stator core to form turn portions,
    the turn portions align in a circumferential direction to constitute coil ends,
    an electrically-insulative resin portion is disposed so as to completely cover the coil ends, and
    at least one surface of the electrically-insulative resin portion selected from a rotor-facing surface and a bracket-facing surface is formed into a smooth surface. Thus, an alternator is provided in which the strands of wire can be installed at high density, improving output, the radiation of heat from the electrically-insulative resin portion becomes uniform in the circumferential direction, improving the cooling of the stator winding, and in addition, wind resistance against the cooling air flowing over the rotor-facing surface or the bracket-facing surface of the electrically-insulative resin portion decreases, reducing wind noise.

The rotor-facing surface of the electrically-insulative resin portion may be formed into a smooth surface, and fins may be formed on the bracket-facing surface of the electrically-insulative resin portion. Thus, because interference noise arising between the electrically-insulative resin portion and the rotor decreases, wind noise is reduced, and because heat generated in the stator winding is transferred through the electrically-insulative resin portion to the fins and is radiated from the fins, temperature increases in the stator winding are suppressed.

The rotor-facing surface of the electrically-insulative resin portion may be formed into a smooth surface, and the bracket-facing surface of the electrically-insulative resin portion may be disposed in close contact with an inner wall surface of the bracket. Thus, because interference noise between the electrically-insulative resin portion and the rotor decreases, wind noise is reduced, and because heat generated in the stator winding is transferred through the electrically-insulative resin portion to the low-temperature bracket, temperature increases in the stator winding are suppressed.

According to another aspect of the present invention, there is provided an alternator including:

a rotor for forming north-seeking (N) and south-seeking (S) poles about a rotational circumference;

a stator including:
  a stator core disposed facing the rotor; and
  a stator winding installed in the stator core;

a bracket supporting the rotor and the stator; and a cooling means for cooling the stator winding by moving together with the rotor and generating a flow of cooling air inside the bracket, wherein
  the stator core includes a laminated core formed with a number of slots extending axially at a predetermined pitch in a circumferential direction,
  the stator winding includes a number of winding sub-portions in each of which a long strand of wire is wound so as to alternately occupy an inner layer and an outer layer in a slot depth direction within the slots at intervals of a predetermined number of slots, the strand of wire folding back outside the slots at first and second axial end surfaces of the stator core to form turn portions,
  the turn portions align in a circumferential direction to constitute coil ends,
  an electrically-insulative resin portion is disposed so as to cover an inner circumferential portion of the coil ends and leave an apex portion and a radially outer circumferential portion of the coil end exposed, and
  a rotor-facing surface of the electrically-insulative resin portion is formed into a smooth surface. Thus, an alternator is provided in which the strands of wire can be installed at high density, improving output, the radiation of heat from the electrically-insulative resin portion becomes uniform in the circumferential direction and heat from the stator winding is radiated from the exposed portions of the coil ends, improving the cooling of the stator winding, and in addition, wind resistance against the cooling air flowing over the rotor-facing surface of the electrically-insulative resin portion decreases and interference noise arising between the electrically-insulative resin portion and the rotor decreases, reducing wind noise.

Because at least some surfaces of the circumferentially-aligned turn portions facing the rotor may be positioned in the same plane as the rotor facing surface of the electrically-insulative resin portion so as to be exposed, the exposed surfaces of the turn portions are exposed to the cooling air, enabling the cooling of the stator winding to be improved.

According to still another aspect of the present invention, there is provided an alternator including:

a rotor for forming north-seeking (N) and south-seeking (S) poles about a rotational circumference;

a stator including:
  a stator core disposed facing the rotor; and
  a stator winding installed in the stator core;

a bracket supporting the rotor and the stator; and a cooling means for cooling the stator winding by moving together with the rotor and generating a flow of cooling air inside the bracket, wherein
  the stator core includes a laminated core formed with a number of slots extending axially at a predetermined pitch in a circumferential direction,
  the stator winding includes a number of winding sub-portions in each of which a long strand of wire is wound so as to alternately occupy an inner layer and an outer layer in a slot depth direction within the slots at intervals of a predetermined number of slots, the strand of wire folding back outside the slots at first and second axial end surfaces of the stator core to form turn portions,
  the turn portions align in a circumferential direction to constitute coil ends,
  an electrically-insulative resin portion is disposed so as to cover an outer circumferential portion of the coil ends and leave an apex portion and a radially inner circumferential portion of the coil end exposed, and
  a bracket-facing surface of the electrically-insulative resin portion is formed into a smooth surface. Thus, an alternator is provided in which the strands of wire can be installed at high density, improving output, the radiation of heat from the electrically-insulative resin portion becomes uniform in the circumferential direction and heat from the stator winding is radiated from the exposed portions of the coil ends, improving the cooling of the stator winding, and in addition, wind resistance against the cooling air flowing over the bracket-facing surface of the electrically-insulative resin portion decreases, reducing wind noise.

2n strands of the strands of wire may be disposed in a row in the depth direction in each of the slots, and the turn portions of the strands of wire may be arranged so as to align into n rows in a circumferential direction. Thus, because the height of the coil ends is reduced, coil-end leakage reactance is reduced and the height of the electrically-insulative resin portion is reduced, reducing wind resistance.

Because the turn portions constituting the coil ends at at least one of the axial end portions of the stator core may be formed with a generally identical shape in a circumferential direction, the electrically-insulative resin portion can be disposed uniformly, enabling the rotor-facing surface and the bracket-facing surface of the electrically-insulative resin portion to be easily formed into a smooth surface.

Because spaces between adjacent turn portions in the coil ends at at least one of the axial end portions of the stator core may be formed so as to be generally identical in a circumferential direction, the electrically-insulative resin portion can be disposed uniformly, enabling the rotor-facing surface and the bracket-facing surface of the electrically-insulative resin portion to be easily formed into a smooth surface. In addition, pressure applied during molding of the resin is uniform, preventing the turn portions from moving due to pressure and interfering with each other.

Because opening dimensions of the opening portions of the slots may be smaller than dimensions of the strands of wire in a slot-width direction, the strands of wire are prevented from dislodging from the slots and electrically-insulative resin flowing into the slots is less likely to flow out through the opening portions.

Because a cross-sectional shape of the strands of wire within the slots may be a rectangular shape following a shape of the slots, the space factor of the strands of wire in the slots is increased, improving output and efficiency. Furthermore, the contact surface area between the strands of wire and the stator core is increased, raising thermal conductivity and further reducing the temperature of the stator winding. In addition, electrically-insulative resin is less likely to flow into the slots, reducing the amount of resin required.

Because a cross-sectional shape of the strands of wire may be a generally flattened shape, the space factor of the strands of wire inside the slots is increased and heat dissipation from the stator winding is improved, improving output and efficiency. In addition, a smooth resin surface is easily formed.

Because at least one of the coil ends of the stator winding may be disposed in close proximity to the cooling means on a downstream side in a direction of the flow of cooling air formed inside the bracket by the cooling means, the cooling air contributes efficiently to the cooling of the coil ends or of the electrically-insulative resin portion, enabling the cooling of the stator winding to be improved.

What is claimed is:

1. An alternator comprising:
   a rotor for forming north-seeking (N) and south-seeking (S) poles about a rotational circumference;
   a stator comprising:
      a stator core disposed facing said rotor; and
      a stator winding installed in said stator core;
   a bracket supporting said rotor and said stator; and
   a cooling means for cooling said stator winding by moving together with said rotor and generating a flow of cooling air inside said bracket,
   wherein
      said stator core comprises a laminated core formed with a number of slots extending axially at a predetermined pitch in a circumferential direction,
      said stator winding comprises a number of winding sub-portions in each of which a long strand of wire is wound so as to alternately occupy an inner layer and an outer layer in a slot depth direction within said slots at intervals of a predetermined number of slots, said strand of wire folding back outside said slots at first and second axial end surfaces of said stator core to form turn portions,
      said turn portions align in a circumferential direction to constitute coil ends,
      an electrically-insulative resin portion is disposed so as to completely cover said coil ends, and
      at least one surface of said electrically-insulative resin portion selected from a rotor-facing surface and a bracket-facing surface is formed into a smooth surface.

2. The alternator according to claim 1 wherein:
   said rotor-facing surface of said electrically-insulative resin portion is formed into a smooth surface; and
   fins are formed on said bracket-facing surface of said electrically-insulative resin portion.

3. The alternator according to claim 1 wherein:
   said rotor-facing surface of said electrically-insulative resin portion is formed into a smooth surface; and
   said bracket-facing surface of said electrically-insulative resin portion is disposed in close contact with an inner wall surface of said bracket.

4. The alternator according to claim 1 wherein at least some surfaces of said circumferentially-aligned turn portions facing said rotor are positioned in the same plane as said rotor-facing surface of said electrically-insulative resin portion so as to be exposed.

5. The alternator according to claim 1 wherein:
   2n strands of said strands of wire are disposed in a row in said depth direction in each of said slots; and
   said turn portions of said strands of wire are arranged so as to align into n rows in a circumferential direction.

6. The alternator according to claim 1 wherein said turn portions constituting said coil ends at at least one of said axial end portions of said stator core are formed with a generally identical shape in a circumferential direction.

7. The alternator according to claim 1 wherein spaces between adjacent turn portions in said coil ends at at least one of said axial end portions of said stator core are formed so as to be generally identical in a circumferential direction.

8. The alternator according to claim 1 wherein opening dimensions of said opening portions of said slots are smaller than dimensions of said strands of wire in a slot-width direction.

9. The alternator according to claim 1 wherein a cross-sectional shape of said strands of wire within said slots is a rectangular shape following a shape of said slots.

10. The alternator according to claim 1 wherein a cross-sectional shape of said strands of wire is a generally flattened shape.

11. The alternator according to claim 1 wherein at least one of said coil ends of said stator winding is disposed in close proximity to said cooling means on a downstream side in a direction of said flow of cooling air formed inside said bracket by said cooling means.

12. An alternator comprising:
    a rotor for forming north-seeking (N) and south-seeking (S) poles about a rotational circumference;
    a stator comprising:
       a stator core disposed facing said rotor; and
       a stator winding installed in said stator core;
    a bracket supporting said rotor and said stator; and
    a cooling means for cooling said stator winding by moving together with said rotor and generating a flow of cooling air inside said bracket,
    wherein
       said stator core comprises a laminated core formed with a number of slots extending axially at a predetermined pitch in a circumferential direction,
       said stator winding comprises a number of winding sub-portions in each of which a long strand of wire is wound so as to alternately occupy an inner layer and an outer layer in a slot depth direction within said slots at intervals of a predetermined number of slots, said strand of wire folding back outside said slots at first and second axial end surfaces of said stator core to form turn portions,
       said turn portions align in a circumferential direction to constitute coil ends,
       an electrically-insulative resin portion is disposed so as to cover an inner circumferential portion of said coil ends and leave an apex portion and a radially outer circumferential portion of said coil end exposed, and
       a rotor-facing surface of said electrically-insulative resin portion is formed into a smooth surface.

13. The alternator according to claim 12 wherein at least some surfaces of said circumferentially-aligned turn portions facing said rotor are positioned in the same plane as said rotor-facing surface of said electrically-insulative resin portion so as to be exposed.

14. The alternator according to claim 12 wherein:
    2n strands of said strands of wire are disposed in a row in said depth direction in each of said slots; and
    said turn portions of said strands of wire are arranged so as to align into n rows in a circumferential direction.

15. The alternator according to claim 12 wherein said turn portions constituting said coil ends at at least one of said axial end portions of said stator core are formed with a generally identical shape in a circumferential direction.

16. The alternator according to claim 12 wherein spaces between adjacent turn portions in said coil ends at at least one of said axial end portions of said stator core are formed so as to be generally identical in a circumferential direction.

17. An alternator comprising:
  a rotor for forming north-seeking (N) and south-seeking (S) poles about a rotational circumference;
  a stator comprising:
    a stator core disposed facing said rotor; and
    a stator winding installed in said stator core;
  a bracket supporting said rotor and said stator; and
  a cooling means for cooling said stator winding by moving together with said rotor and generating a flow of cooling air inside said bracket,
wherein
  said stator core comprises a laminated core formed with a number of slots extending axially at a predetermined pitch in a circumferential direction,
  said stator winding comprises a number of winding sub-portions in each of which a long strand of wire is wound so as to alternately occupy an inner layer and an outer layer in a slot depth direction within said slots at intervals of a predetermined number of slots, said strand of wire folding back outside said slots at first and second axial end surfaces of said stator core to form turn portions, said turn portions align in a circumferential direction to constitute coil ends,
  an electrically-insulative resin portion is disposed so as to cover an outer circumferential portion of said coil ends and leave an apex portion and a radially inner circumferential portion of said coil end exposed, and
  a bracket-facing surface of said electrically-insulative resin portion is formed into a smooth surface.

18. The alternator according to claim 17 wherein:
  2n strands of said strands of wire are disposed in a row in said depth direction in each of said slots; and
  said turn portions of said strands of wire are arranged so as to align into n rows in a circumferential direction.

19. The alternator according to claim 17 wherein said turn portions constituting said coil ends at at least one of said axial end portions of said stator core are formed with a generally identical shape in a circumferential direction.

20. The alternator according to claim 17 wherein spaces between adjacent turn portions in said coil ends at at least one of said axial end portions of said stator core are formed so as to be generally identical in a circumferential direction.

* * * * *